United States Patent
Iwasaki et al.

(10) Patent No.: US 11,691,070 B2
(45) Date of Patent: Jul. 4, 2023

(54) IN-VEHICLE PERFORMANCE DEVICE, IN-VEHICLE PERFORMANCE SYSTEM, IN-VEHICLE PERFORMANCE METHOD, STORAGE MEDIUM, AND COMMAND MEASUREMENT DEVICE

(71) Applicant: HONDA MOTOR CO., LTD., Tokyo (JP)

(72) Inventors: Shun Iwasaki, Wako (JP); Hisao Asaumi, Wako (JP); Kentaro Ishisaka, Wako (JP); Izumi Kondo, Wako (JP); Satoshi Koike, Wako (JP); Tomohisa Manabe, Wako (JP); Yo Ito, Tokyo (JP); Yuki Hayashi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 371 days.

(21) Appl. No.: 16/622,335

(22) PCT Filed: Jun. 15, 2018

(86) PCT No.: PCT/JP2018/022826
§ 371 (c)(1),
(2) Date: Dec. 13, 2019

(87) PCT Pub. No.: WO2018/230678
PCT Pub. Date: Dec. 20, 2018

(65) Prior Publication Data
US 2020/0197791 A1  Jun. 25, 2020

(30) Foreign Application Priority Data

Jun. 16, 2017 (JP) ................................ 2017-119025

(51) Int. Cl.
*A63F 13/219* (2014.01)
*A63F 13/211* (2014.01)
(Continued)

(52) U.S. Cl.
CPC .......... *A63F 13/211* (2014.09); *A63F 13/219* (2014.09); *A63F 13/428* (2014.09);
(Continued)

(58) Field of Classification Search
None
See application file for complete search history.

(56) References Cited

U.S. PATENT DOCUMENTS

| 6,060,993 A | 5/2000 | Cohen |
| 6,236,330 B1 | 5/2001 | Cohen |

(Continued)

FOREIGN PATENT DOCUMENTS

| JP | 03-044800 | 4/1991 |
| JP | 09-153098 | 6/1997 |

(Continued)

OTHER PUBLICATIONS

Non-Final Office Action for U.S. Appl. No. 16/622,008 dated Oct. 27, 2020.

(Continued)

*Primary Examiner* — Damon J Pierce
(74) *Attorney, Agent, or Firm* — Amin, Turocy & Watson, LLP

(57) ABSTRACT

An in-vehicle performance device is an in-vehicle performance device that performs a game that is played by an occupant in a vehicle, and includes a motion detector configured to detect a motion of the occupant irrelevant to driving the vehicle, a display configured to display an image visually recognizable by the occupant, and a display controller configured to display a response image according to the motion of the occupant on the display on the basis of the motion of the occupant detected by the motion detector, and output a result of a game based on a predetermined rule.

9 Claims, 12 Drawing Sheets

(51) Int. Cl.
*A63F 13/428* (2014.01)
*A63F 13/803* (2014.01)
*B60K 35/00* (2006.01)

(52) U.S. Cl.
CPC ............ *A63F 13/803* (2014.09); *B60K 35/00* (2013.01); *B60K 2370/1529* (2019.05); *B60K 2370/31* (2019.05); *B60K 2370/52* (2019.05)

(56) References Cited

U.S. PATENT DOCUMENTS

| | | | |
|---|---|---|---|
| 6,545,596 | B1 | 4/2003 | Moon |
| 6,857,889 | B1 | 2/2005 | Vitale |
| 6,898,517 | B1 | 5/2005 | Froeberg |
| 7,154,383 | B2 | 12/2006 | Berquist |
| 8,024,111 | B1 | 9/2011 | Meadows et al. |
| 8,958,943 | B2 | 2/2015 | Bertosa et al. |
| 9,216,745 | B2 | 12/2015 | Beardsley et al. |
| 9,791,861 | B2 | 10/2017 | Keohane et al. |
| 11,049,208 | B2 | 6/2021 | Petroff |
| 11,364,447 | B2 | 6/2022 | Allmendinger et al. |
| 2002/0198747 | A1 | 12/2002 | Boyer et al. |
| 2005/0022134 | A1 | 1/2005 | Tokashiki |
| 2005/0096974 | A1 | 5/2005 | Chagoly et al. |
| 2008/0143141 | A1 | 6/2008 | Ruslanov et al. |
| 2009/0303079 | A1 | 12/2009 | Khim |
| 2010/0036717 | A1 | 2/2010 | Trest |
| 2010/0292886 | A1 | 11/2010 | Szczerba et al. |
| 2011/0101646 | A1 | 5/2011 | Sakita |
| 2012/0013179 | A1 | 1/2012 | Muto et al. |
| 2012/0120930 | A1 | 5/2012 | Ji et al. |
| 2012/0142415 | A1* | 6/2012 | Lindsay ............... G06T 19/006 463/33 |
| 2012/0181781 | A1 | 7/2012 | Gaussin et al. |
| 2013/0113936 | A1 | 5/2013 | Cohen et al. |
| 2013/0162639 | A1* | 6/2013 | Muench ............... A63F 13/655 345/419 |
| 2014/0081764 | A1 | 3/2014 | James |
| 2014/0095234 | A1 | 4/2014 | Johnson |
| 2014/0121883 | A1 | 5/2014 | Shen et al. |
| 2014/0365250 | A1 | 12/2014 | Ikeda et al. |
| 2015/0046187 | A1 | 2/2015 | Johnson et al. |
| 2015/0051778 | A1 | 2/2015 | Mueller |
| 2015/0062469 | A1 | 3/2015 | Fleury |
| 2015/0066282 | A1 | 3/2015 | Yopp |
| 2015/0112800 | A1 | 4/2015 | Binion et al. |
| 2015/0161526 | A1 | 6/2015 | Yalcin et al. |
| 2015/0220991 | A1 | 8/2015 | Butts et al. |
| 2015/0227888 | A1 | 8/2015 | Levanon et al. |
| 2015/0271532 | A1 | 9/2015 | Igarashi |
| 2015/0293509 | A1 | 10/2015 | Bankowski et al. |
| 2015/0345814 | A1 | 12/2015 | Nakano et al. |
| 2016/0063862 | A1 | 3/2016 | Rosen |
| 2016/0082839 | A1 | 3/2016 | Ricci |
| 2016/0089610 | A1* | 3/2016 | Boyle ..................... A63F 13/69 463/7 |
| 2016/0121907 | A1 | 5/2016 | Otake |
| 2017/0061561 | A1 | 3/2017 | Cha |
| 2017/0075366 | A1 | 3/2017 | Esselink et al. |
| 2017/0109805 | A1 | 4/2017 | Eisen |
| 2018/0060827 | A1 | 3/2018 | Abbas et al. |
| 2018/0102964 | A1 | 4/2018 | Kao et al. |
| 2018/0182055 | A1 | 6/2018 | Jepson et al. |
| 2018/0224844 | A1 | 8/2018 | Zhang et al. |
| 2018/0275661 | A1 | 9/2018 | Glaser |
| 2020/0189466 | A1* | 6/2020 | Askeland ............... G06F 3/1431 |
| 2020/0398915 | A1 | 12/2020 | Birnschein et al. |

FOREIGN PATENT DOCUMENTS

| | | |
|---|---|---|
| JP | 10-254946 | 9/1998 |
| JP | 11-231935 | 8/1999 |
| JP | 2000-035337 | 2/2000 |
| JP | 2001-154733 | 6/2001 |
| JP | 2002-099961 | 4/2002 |
| JP | 2002-186055 | 6/2002 |
| JP | 2002-187577 | 7/2002 |
| JP | 2002-288521 | 10/2002 |
| JP | 2003-063301 | 3/2003 |
| JP | 2003-199083 | 7/2003 |
| JP | 2003-259354 | 9/2003 |
| JP | 2003-308265 | 10/2003 |
| JP | 2004-061285 | 2/2004 |
| JP | 2004-192366 | 7/2004 |
| JP | 2004-194007 | 7/2004 |
| JP | 2004-234469 | 8/2004 |
| JP | 2004-362064 | 12/2004 |
| JP | 2005-004407 | 1/2005 |
| JP | 2005-032066 | 2/2005 |
| JP | 2005-056134 | 3/2005 |
| JP | 2005-066745 | 3/2005 |
| JP | 2006-018570 | 1/2006 |
| JP | 2007-080060 | 3/2007 |
| JP | 2007-172378 | 7/2007 |
| JP | 2007-228551 | 9/2007 |
| JP | 2008-103828 | 5/2008 |
| JP | 2008-534372 | 8/2008 |
| JP | 2008-280813 | 11/2008 |
| JP | 2009-015760 | 1/2009 |
| JP | 2009-105973 | 5/2009 |
| JP | 2010-204708 | 9/2010 |
| JP | 2010-237411 | 10/2010 |
| JP | 2011-162273 | 8/2011 |
| JP | 2012-108599 | 6/2012 |
| JP | 2013-109469 | 6/2013 |
| JP | 2013-210713 | 10/2013 |
| JP | 2013-214167 | 10/2013 |
| JP | 2014-006890 | 1/2014 |
| JP | 2014-238831 | 12/2014 |
| JP | 2015-085807 | 5/2015 |
| JP | 2015-090676 | 5/2015 |
| JP | 2015-092327 | 5/2015 |
| JP | 2015-093078 | 5/2015 |
| JP | 2015-179414 | 10/2015 |
| JP | 2015-184710 | 10/2015 |
| JP | 2015-184885 | 10/2015 |
| JP | 2015-191264 | 11/2015 |
| JP | 2015-206655 | 11/2015 |
| JP | 2016-040151 | 3/2016 |
| JP | 2016-065938 | 4/2016 |
| JP | 2016-090274 | 5/2016 |
| JP | 2016-206715 | 12/2016 |
| JP | 2017-033480 | 2/2017 |
| JP | 2017-061168 | 3/2017 |
| JP | 2017-083446 | 5/2017 |
| JP | 2017-191371 | 10/2017 |
| JP | 2018-008688 | 1/2018 |
| WO | 2017/033172 | 3/2017 |
| WO | 2018/230677 | 12/2018 |
| WO | 2018/230679 | 12/2018 |
| WO | 2018/230685 | 12/2018 |
| WO | 2018/230691 | 12/2018 |
| WO | 2018/230698 | 12/2018 |
| WO | 2018/230704 | 12/2018 |
| WO | 2018/230709 | 12/2018 |
| WO | 2018/230720 | 12/2018 |

OTHER PUBLICATIONS

Non-Final Office Action for U.S. Appl. No. 16/622,336 dated Oct. 14, 2021.
Non-Final Office Action for U.S. Appl. No. 16/621,458 dated Nov. 8, 2021.
Non-Final Office Action for U.S. Appl. No. 16/622,012 dated Aug. 30, 2021.
International Search Report and Written Opinion for International Application Serial No. PCT/JP2018/022826 dated Sep. 18, 2018, 17 pages.
International Search Report for International Application Serial No. PCT/JP2018/022825 dated Sep. 18, 2018, 2 pages.
International Search Report for International Application Serial No. PCT/JP2018/023043 dated Sep. 18, 2018, 4 pages.

(56) References Cited

OTHER PUBLICATIONS

International Search Report for International Application Serial No. PCT/JP2018/022929 dated Jul. 17, 2018, 4 pages.
International Search Report for International Application Serial No. PCT/JP2018/022829 dated Aug. 21, 2018, 2 pages.
International Search Report for International Application Serial No. PCT/JP2018/022919 dated Sep. 18, 2018, 4 pages.
International Search Report for International Application Serial No. PCT/JP2018/022875 dated Sep. 11, 2018, 4 pages.
International Search Report for International Application Serial No. PCT/JP2018/022852 dated Sep. 18, 2018, 2 pages.
International Search Report for International Application Serial No. PCT/JP2018/022826 dated Sep. 18, 2018, 8 pages.
International Search Report for International Application Serial No. PCT/JP2018/022991 dated Aug. 21, 2018, 3 pages.
International Search Report for International Application Serial No. PCT/JP2018/022845 dated Sep. 18, 2018, 4 pages.
Carcade In-Car Gaming, Oh Gizmo!, Oct. 8, 2008, search date Sep. 4, 2018, internet<URL: https://www.gizmodo.jp/2008/10/carcadear.html>.
Gizmodo, AR world (video clip) of "Carcade" in which the scenery of the car window becomes arcade game, Oct. 10, 2008, search date Sep. 4, 2018, internet<URL: https://www.gizmodo.jp/2008/10/carcadear.html>.
V. Cichella, T. Marinho, D. Stipanovic, N. Hovakimyan, I. Kaminer and A. Trujillo, "Collision avoidance based on line-of-sight angle,", 2015 54th IEEE Conference on Decision and Control (CDC), 2015, pp. 6779-6784.
Non-Final Office Action for U.S. Appl. No. 16/621,456 dated Jul. 14, 2022.
Final Office Action for U.S. Appl. No. 16/622,336 dated Mar. 3, 2022.
Non-Final Office Action for U.S. Appl. No. 16/621,456 dated Mar. 22, 2022.
Daily, et al. "WebOn World: Geo-coded Video and Spatial Audio in Vehicles," 2007 IEEE Aerospace Conference, 2007, pp. 1-13.
Kabir, et al. "SocioTelematics: Leveraging Interaction-Relationships in Developing Telematics Systems to Support Cooperative Convoys," 2012 9th International Conference on Ubiquitous Intelligence and Computing and 9th International Conference on Autonomic and Trusted Computing.
Japanese Office Action for JP Patent Application No. 2020-006390 dated Jul. 19, 2022.
Japanese Office Action for Japanese Patent Application No. 2020-006723 dated Jun. 28, 2022.
Japanese Office Action for Japanese Patent Application No. 2020-006009 dated Jul. 5, 2022.
Final Office Action for U.S. Appl. No. 16/621,458 dated May 2, 2022.
Non-Final Office Action for U.S. Appl. No. 16/622,007 dated May 31, 2022.
Non-Final Office Action for JP Patent Application No. 2020-006721 dated Jun. 7, 2022.
Non-Final Office Action for U.S. Appl. No. 16/622,026 dated Jun. 20, 2022.
Japanese Office Action for Japanese Patent Application No. 2020-006808 dated Aug. 23, 2022.
Japanese Office Action for Japanese Patent Application No. 2020-006009 dated Oct. 4, 2022.
Final Office Action for U.S. Appl. No. 16/622,077 dated Dec. 13, 2022.
MobilityWorks, "Assisted Living Resident Transportation: Beyond the Occasional Doctor's Appointment", May 10, 2014.
On Time Ambulance, "10 Ways to Transport a Senior to the Doctor or Other Appointments", On Time Medical Transportation, Jul. 28, 2016.
Non-Final Office Action for U.S. Appl. No. 16/621,071 dated Nov. 9, 2022.
Final Office Action for U.S. Appl. No. 16/621,071 dated May 3, 2023.

\* cited by examiner

FIG. 12

500-2; HISTORY INFORMATION

| OCCUPANT ID | POINTING DATE AND TIME | TARGET | SERVICE PROVIDER |
|---|---|---|---|
| 001 (Mr. A) | YYYY/MM/DD HH:MM | SIGNBOARD OF ○ STORE | XX CONVENIENCE STORE |
| | YYYY/MM/DD HH:MM | SIGNBOARD OF △ STORE | XX CONVENIENCE STORE |
| | | ○ AFFILIATED STORE | XX BANK |

FOR EACH OCCUPANT ID

FOR EACH OCCUPANT ID

500-3; SERVICE PROVIDER INFORMATION

| SERVICE PROVIDER NAME | NOTIFICATION DESTINATION |
|---|---|
| XX CONVENIENCE STORE | TERMINAL DEVICE TM1 OF XX CONVENIENCE STORE |
| XX BANK | TERMINAL DEVICE TM2 OF XX BANK |

⋮

IN-VEHICLE PERFORMANCE DEVICE, IN-VEHICLE PERFORMANCE SYSTEM, IN-VEHICLE PERFORMANCE METHOD, STORAGE MEDIUM, AND COMMAND MEASUREMENT DEVICE

TECHNICAL FIELD

The present invention relates to an in-vehicle performance device, an in-vehicle performance system, an in-vehicle performance method, a program, and a pointing measurement device.

Priority is claimed on Japanese Patent Application No. 2017-119025, filed Jun. 16, 2017, the content of which is incorporated herein by reference.

BACKGROUND ART

In the related art, a technology for calculating a driving skill score of a driver of a vehicle is known (for example, Patent Literature 1).

CITATION LIST

Patent Literature

[Patent Literature 1]
Japanese Unexamined Patent Application, First Publication 2015-90676

SUMMARY OF INVENTION

Technical Problem

In the related art, entertainment is not provided to an occupant in a vehicle. The present invention has been made in view of the above problem, and an object of the present invention is to provide entertainment of a movement using a vehicle to an occupant in the vehicle.

Solution to Problem

An in-vehicle performance device, an in-vehicle performance system, an in-vehicle performance method, and a program according to the present invention adopt the following configurations.

(1) An aspect of the present invention is an in-vehicle performance device performing a game played by an occupant in a vehicle, the in-vehicle performance device including: a motion detector configured to detect a motion of the occupant irrelevant to driving the vehicle; a display configured to display an image visually recognizable by the occupant; and a display controller configured to display a response image according to the motion of the occupant on the display on the basis of the motion of the occupant detected by the motion detector, and output a result of the game based on a predetermined rule.

(2) In the in-vehicle performance device according to the aspect (1), the display controller may cause the response image to be superimposed on an object in a surrounding environment of the vehicle and displayed on the display.

(3) In the in-vehicle performance device according to aspect (2), the motion of the occupant may be a motion for pointing at the object in the surrounding environment, the motion detector may detect a pointing direction of the occupant, and the display controller may cause the response image to be displayed on the display so that the response image is superimposed on a specific object in the pointing direction, on the basis of the direction detected by the motion detector.

(4) The in-vehicle performance device according to aspect (2) or (3), the in-vehicle performance device may further include: a score calculator (17) configured to calculate, as an effective score, the number of times the motion detector detects a motion for pointing at a specific object, wherein the display controller may cause an image showing the score calculated by the score calculator to be displayed on the display at a predetermined timing.

(5) In the in-vehicle performance device according to aspect (4), the specific object may be a specific road sign to a destination, and the in-vehicle performance device may further include: a destination information acquirer configured to acquire destination information indicating the destination; an imager configured to image the surrounding environment and generate a surrounding environment image; and an extractor configured to extract the specific road sign to the destination indicated by the destination information from the surrounding environment image, wherein the score calculator may calculate, as an effective score, the number of times the motion detector has detected the motion of the occupant pointing at a position corresponding to the road sign extracted by the extractor.

(6) In the in-vehicle performance device according to the aspect (5), the specific object may be another vehicle traveling around the vehicle, the extractor may extract the other vehicle from the surrounding environment image, and the score calculator may calculate, as an effective score, the number of times the motion detector has detected the motion of the occupant pointing at a position corresponding to the other vehicle extracted by the extractor.

(7) In the in-vehicle performance device according to the aspect (5) or (6), the specific object may be a signboard of a store present around the vehicle, the extractor may extract the signboard from the surrounding environment image, and the score calculator may calculate, as an effective score, the number of times the motion detector has detected the motion of the occupant pointing at a position corresponding to the signboard extracted by the extractor.

(8) In the in-vehicle performance device according to any one of the aspects (4) to (7), the display controller may cause an image showing a sum of scores calculated by the score calculator to be displayed on the display.

(9) Another aspect of the present invention is an in-vehicle performance system including a plurality of the in-vehicle performance devices according to any one of aspects (4) to (8), wherein the in-vehicle performance device includes a transmitter configured to transmit information indicating the score calculated by the score calculator to another in-vehicle performance device; and a receiver configured to receive score information indicating a score calculated by the other in-vehicle performance device, and the display controller causes an image showing the score calculated by the score calculator and an image showing the score of the score information received by the receiver to be displayed on the display.

(10) In the in-vehicle performance system according to the aspect (9), the display controller may compare the image showing the score of the score information received from the in-vehicle performance device mounted in a vehicle belonging to the same team as the in-vehicle performance device with the image showing the score of the score information received from the in-vehicle performance device mounted in a vehicle belonging to another team, and cause a comparison result to be displayed on the display.

(11) In the in-vehicle performance system according to the aspect (9) or (10), the display controller may cause an image for prompting a movement to be displayed, on the basis of information indicating a behavior of the vehicle having the in-vehicle performance device mounted therein and information indicating a behavior of the vehicle having the other in-vehicle performance device mounted therein.

(12) Yet another aspect of the present invention is an in-vehicle performance method including: detecting, by a computer including a display and performing a game played by an occupant in a vehicle, a motion of the occupant irrelevant to driving the vehicle; displaying, by the computer, an image visually recognizable by the occupant; and displaying, by the computer, a response image according to the motion of the occupant on the basis of the detected motion of the occupant, and outputting a result of the game based on a predetermined rule.

(13) Yet another aspect of the present invention is a program causing a computer including a display and performing a game played by an occupant in a vehicle to: detect a motion of the occupant irrelevant to driving the vehicle; display an image visually recognizable by the occupant; and display a response image according to the motion of the occupant on the basis of the detected motion of the occupant, and output a result of the game based on a predetermined rule.

(14) Yet another aspect of the present invention is a pointing measurement device including: a motion detector configured to detect a motion of an occupant in a vehicle; a line-of-sight detector configured to detect a viewpoint position of the occupant; a coordinate acquirer configured to acquire a three-dimensional point group in a real space in a pointing direction indicated by the pointing motion of the occupant on the basis of a pointing motion of the occupant detected by the motion detector and the viewpoint position of the occupant detected by the line-of-sight detector; a target information acquirer configured to acquire information indicating a target associated with the three-dimensional point group acquired by the coordinate acquirer from an interface supplying information indicating the target present in a real space indicated by the three-dimensional point group; a service provider specifier configured to specify a service provider associated with the target indicated by the information acquired by the target information acquirer, on the basis of servicer information indicating the service provider associated with the target; and a history information generator configured to generate history information in which the service provider specified by the service provider specifier is associated with the target indicated by the information acquired by the target information acquirer.

(15) In the pointing measurement device according to the aspect (14), a time when the pointing motion has been performed and information indicating the occupant may be further associated with the history information.

(16) The pointing measurement device according to the aspect (14) or (15) may further include: an imager configured to image a surrounding environment and generate a surrounding environment image; and an attribute specifier configured to specify an attribute of the surrounding environment on the basis of the surrounding environment image captured by the imager, wherein the coordinate acquirer may acquire a three-dimensional point group in a real space in a pointing direction according to a pointing motion of the occupant on the basis of the attribute of the surrounding environment specified by the attribute specifier.

(17) The pointing measurement device according to any one of the aspects (14) to (16) may further include: a notifier configured to notify the service provider shown in the history information that the pointing motion has been performed.

(18) In the pointing measurement device according to the aspect (17), the notifier may notify the occupant of the history information.

(19) The pointing measurement device according to any one of the aspects (14) to (18) may further include an imager configured to image a surrounding environment and generate a surrounding environment image, wherein the coordinate acquirer acquires information indicating a three-dimensional point group based on the surrounding environment image captured by the imager from an interface supplying the three-dimensional point group on the basis of the surrounding environment image.

Advantageous Effects of Invention

According to the aspects (1) to (19) described above, it is possible to provide entertainment of a movement using a vehicle to an occupant in the vehicle.

BRIEF DESCRIPTION OF DRAWINGS

FIG. 12 is a diagram showing an example of content of history information.

FIG. 13 is a diagram showing an example of content of service provider information.

DESCRIPTION OF EMBODIMENTS

First Embodiment

Figure 1:
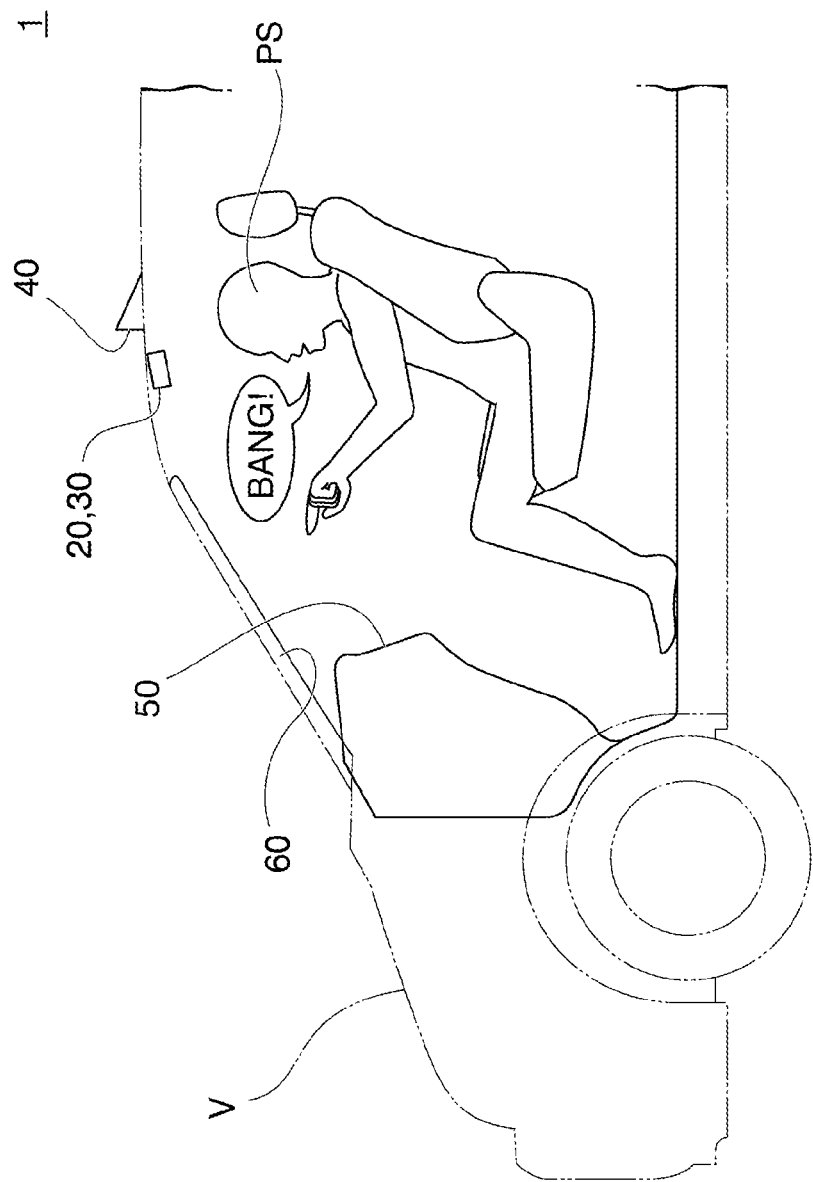
FIG. 1 is a diagram showing an overview of an in-vehicle performance device according to a first embodiment.

Hereinafter, a first embodiment of the present invention will be described with reference to the drawings. FIG. 1 is a diagram showing an overview of an in-vehicle performance device 1 according to the first embodiment. The in-vehicle performance device 1 is a device that provides entertainment to an occupant (hereinafter referred to as an occupan PS) in a vehicle (hereinafter referred to as a vehicle V) who is moved by the vehicle V. The in-vehicle performance device 1 performs, for example, a shooting game in which an object present in a surrounding environment of the vehicle V is a shooting target during a movement of the vehicle V. In an example of the first embodiment, the vehicle V travels according to automated driving. The in-vehicle performance device 1 is disposed in the vehicle V. Further, a sound detector 20, a motion detector 30, an imager 40, an inputter 50, and a display 60 are disposed in the vehicle V.

The sound detector 20 detects sound that is emitted by the occupant PS. The sound detector 20 is, for example, a microphone. The motion detector 30 detects a motion of the occupant PS. The motion detector 30 is, for example, a motion sensor. The imager 40 images a surrounding environment in which the vehicle V travels. The inputter 50 includes an input device and receives an input motion of the occupant PS. The input device includes a device that inputs text information such as a keyboard, a pointing device such as a mouse or a touch panel, a button, a dial, a joystick, a touch sensor, a touch pad, or the like. The display 60 displays various types of information on the basis of control of the in-vehicle performance device 1. In an example of the first embodiment, the display 60 is a transmissive display and is disposed in contact with a front window of the vehicle V. The occupant PS can visually recognize the surrounding environment of the vehicle V and an image displayed on the display 60 from the front window. The vehicle V may not include the front window. In this case, the display 60 displays the surrounding environment image of the vehicle V imaged by the imager 40 to be superimposed on the response image. The display 60 may be a heads-up display (HUD).

The in-vehicle performance device 1 displays a response image according to a motion of the occupant PS on the display 60 on the basis of detection results of the sound detector 20 and the motion detector 30 and information input to the inputter 50. The in-vehicle performance device 1 presents the response image or calculates a score associated with the shooting motion on the basis of, for example, a motion in which the occupant PS shoots the object present in the surrounding environment of the vehicle V (hereinafter referred to as the shooting motion). Hereinafter, a specific configuration of the in-vehicle performance device 1 will be described.

[Functional Configuration of in-Vehicle Performance Device]

Figure 2:
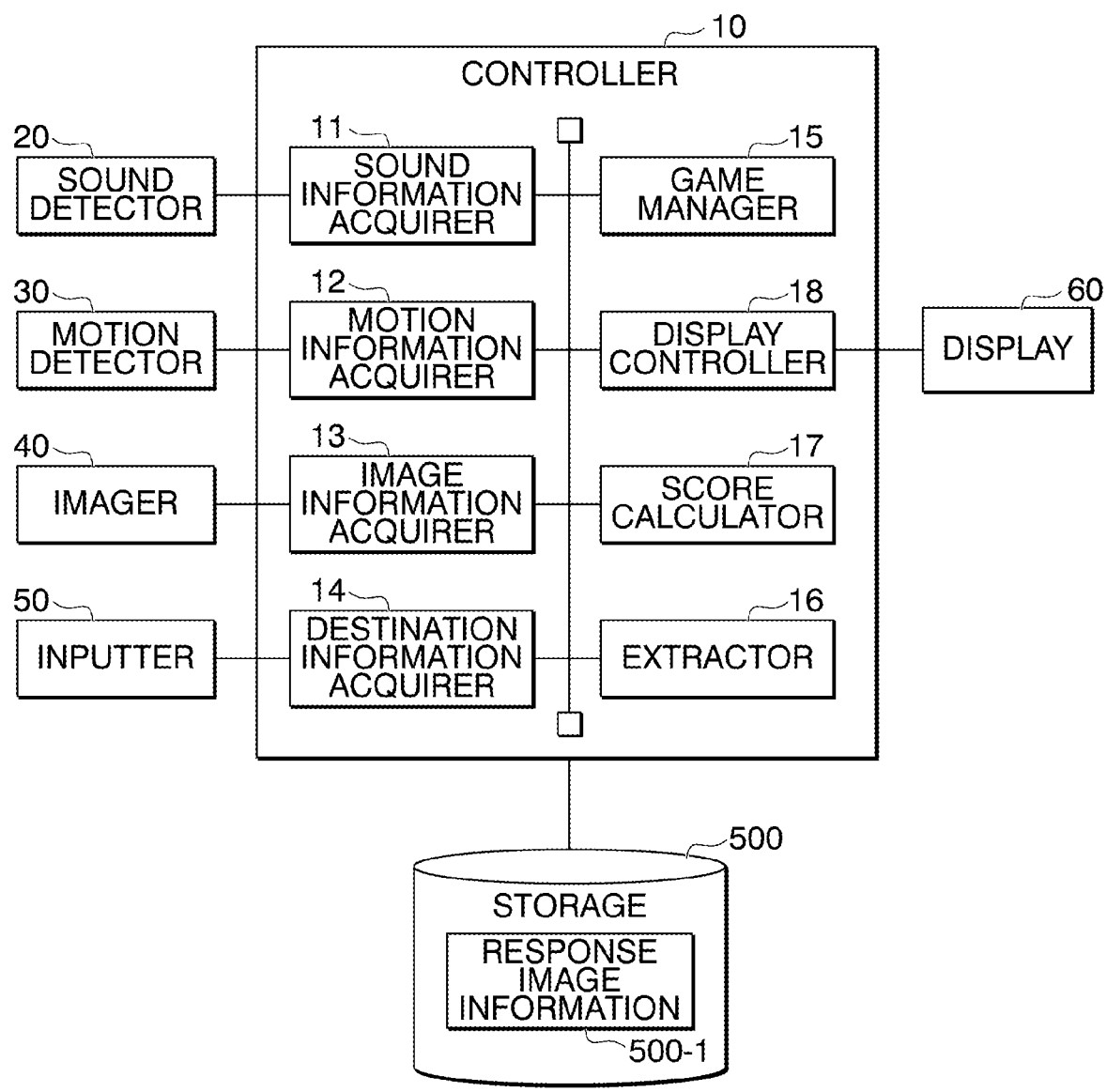
FIG. 2 is a functional configuration diagram showing an example of a configuration of the in-vehicle performance device according to the first embodiment.

FIG. 2 is a functional configuration diagram showing an example of the configuration of the in-vehicle performance device 1 according to the first embodiment. The in-vehicle performance device 1 includes a controller 10, a sound detector 20, a motion detector 30, an imager 40, an inputter 50, a display 60, and a storage 500. Information indicating the response image (hereinafter, response image information 500-1) is stored in the storage 500.

The controller 10 realizes, for example, a sound information acquirer 11, a motion information acquirer 12, an image information acquirer 13, a destination information acquirer 14, a game manager 15, an extractor 16, a score calculator 17, and a display controller 18 as functional units thereof, by a processor such as a central processing unit (CPU) executing a program stored in the storage 500. These functional units may be realized by hardware such as a large scale integration (LSI), an application specific integrated circuit (ASIC), or a field-programmable gate array (FPGA) or may be realized by software and hardware in cooperation.

The sound information acquirer 11 acquires sound information indicating a sound of the occupant PS detected by the sound detector 20. The motion information acquirer 12 acquires motion information indicating the motion of the occupant PS detected by the motion detector 30. In an example of the first embodiment, the occupant PS performs a motion for emitting a sound imitating a shooting sound and pointing at an object (a shooting target) present in the surrounding environment of the vehicle V with a finger, as the shooting motion. Therefore, the sound information includes the sound imitating the shooting sound. "Bang!" shown in FIG. 1 indicates content of the sound obtained by the occupant PS imitating the shooting sound. Further, the motion information includes a pointing motion for pointing at the shooting target. The sound information acquirer 11 outputs the acquired sound information to the display controller 18 and the score calculator 17. Further, the motion information acquirer 12 outputs the acquired motion information to the display controller 18 and the score calculator 17.

The image information acquirer 13 acquires information indicating a surrounding environment image generated by the imager 40 imaging the surrounding environment in which the vehicle V travels (hereinafter, image information). The image information acquirer 13 outputs the acquired image information to the extractor 16. The destination information acquirer 14 acquires information indicating a destination indicated by an operation input to the inputter 50 (hereinafter referred to as destination information). The vehicle V, for example, travels according to automated driving toward the destination indicated by the destination information acquired by the destination information acquirer 14. Further, the destination information acquirer 14 outputs the destination information to the display controller 18.

The game manager 15 manages the shooting game that is performed by the in-vehicle performance device 1. The game manager 15, for example, manages starting and ending of the shooting game. For example, when the operation input to the inputter 50 indicates the starting of the shooting game, the game manager 15 executes a process of starting the shooting game. Further, when the operation input to the inputter 50 indicates the ending of the shooting game, the game manager 15 performs a process of ending the shooting game. The process of starting the shooting game is a process of permitting the extractor 16, the score calculator 17, and the display controller 18 to execute various processes (hereinafter referred to as an enabling process). Further, the process of ending the shooting game is a process of not permitting the extractor 16, the score calculator 17, and the display controller 18 to execute various processes (hereinafter referred to as a disabling process). The extractor 16, the score calculator 17, and the display controller 18 execute various processes when the game manager 15 executes the enabling process, and does not execute various processes when the game manager 15 executes the disabling process.

In the above description, a case in which the game manager 15 acquires information indicating the starting and ending of the shooting game on the basis of the operation input to the inputter 50 has been described, but the present invention is not limited thereto. The starting and ending of the shooting game may be instructed using a sound of the occupant PS. In this case, the game manager 15 may manage the starting and ending of the shooting game on the basis of a detection result of the sound detector 20. Further, a configuration in which the game manager 15 determines a degree of excitement of an in-vehicle environment of the vehicle V on the basis of a detection result of the sound detector 20 or the motion detector 30 may be adopted. The game manager 15 may automatically execute the enabling process when the degree of excitement of the in-vehicle environment of the vehicle V is low. In this case, the in-vehicle performance device 1 can play the shooting game when the inside of the vehicle is not excited, and excite the inside of the vehicle. Further, the game manager 15 may automatically execute the disabling process when the degree of excitement of the in-vehicle environment of the vehicle V is low. In this case, the in-vehicle performance device 1 can end the shooting game when the inside of the vehicle is not excited by the performed shooting game.

The extractor 16 receives the image information from the image information acquirer 13. The extractor 16 performs an image recognition process on the surrounding environment image indicated by the image information, and extracts an object that is a shooting target of the occupant PS. The extractor 16 extracts, for example, an object such as a preceding vehicle, a following vehicle, a vehicle traveling at the side, and an oncoming vehicle traveling around the vehicle V, a signboard of a store present around the vehicle V, or a road sign, as the shooting target of the occupant PS. Further, the extractor 16 matches a position of an actual object around the vehicle V with a position of the extracted object (the shooting target) on the basis of the surrounding environment image, and outputs information indicating a position of the shooting target to the score calculator 17.

Specifically, the extractor 16 performs an image recognition process on the surrounding environment image, and recognizes positions on the surrounding environment image of various objects captured in the surrounding environment image. Further, the extractor 16 matches a position on the front window when the surrounding environment image has been presented in an actual size on the front window with a position on the surrounding environment image of the extracted object (the shooting target). The extractor 16 outputs the position of the front window to the score calculator 17 and the display controller 18 as virtual position information indicating a virtual position of the shooting target.

The score calculator 17 calculates a score for the motion of the occupant PS on the basis of the sound information input from the sound information acquirer 11, the motion information acquired by the motion information acquirer 12, and the virtual position information input from the extractor 16. For example, when the sound information indicates the sound imitating the shooting sound and a pointing direction of the pointing motion indicated by the motion information is a direction of the position of the shooting target indicated by the virtual position information, the score calculator 17 calculate a high score for the motion of the occupant PS. Further, when the sound information indicates the sound imitating the shooting sound and the pointing direction of the pointing motion indicated by the motion information is not the direction of the position of the shooting target indicated by the virtual position information, the score calculator 17 calculate a low score for the motion of the occupant PS. The score calculator 17 outputs score information indicating the calculated score to the display controller 18.

The display controller 18 displays the response image on the display 60 on the basis of the sound information input from the sound information acquirer 11, the motion information input from the motion information acquirer 12, the destination information input from the destination information acquirer 14, the virtual position information input from the extractor 16, and the score information input from the score calculator 17. Hereinafter, a specific example of the response image displayed on the display 60 by the display controller 18 will be described.

[Example of response image showing that shooting motion has been detected]

Figure 3:
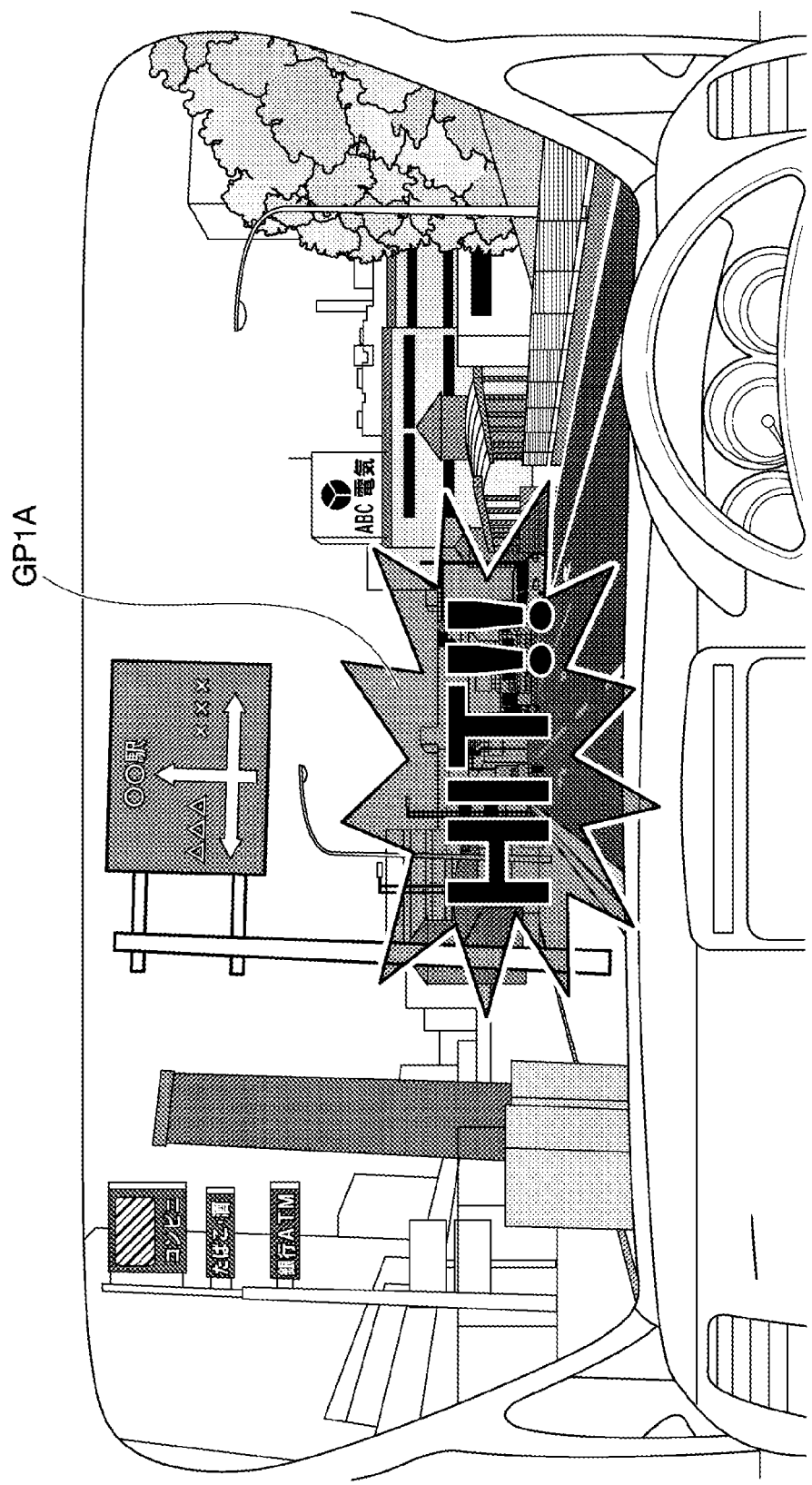
FIG. 3 is a diagram showing an example of a response image showing that a shooting motion has been detected.

FIG. 3 is a diagram showing an example of a response image GP1A showing that the shooting motion has been detected. The display controller 18 displays a response image (the shown response image GP1A) showing that the shooting motion has been detected on the display 60 when the sound information indicates the sound imitating the shooting sound and the motion information indicates the pointing motion. As shown in FIG. 3, the response image GP1A is, for example, an image showing that the shooting target has been hit by shooting. The display controller 18 presents the response image GP1A and clearly indicates that the shooting motion has been detected, to the occupant PS.

[Example of Response Image Showing that Shooting has been Performed]

Figure 4:
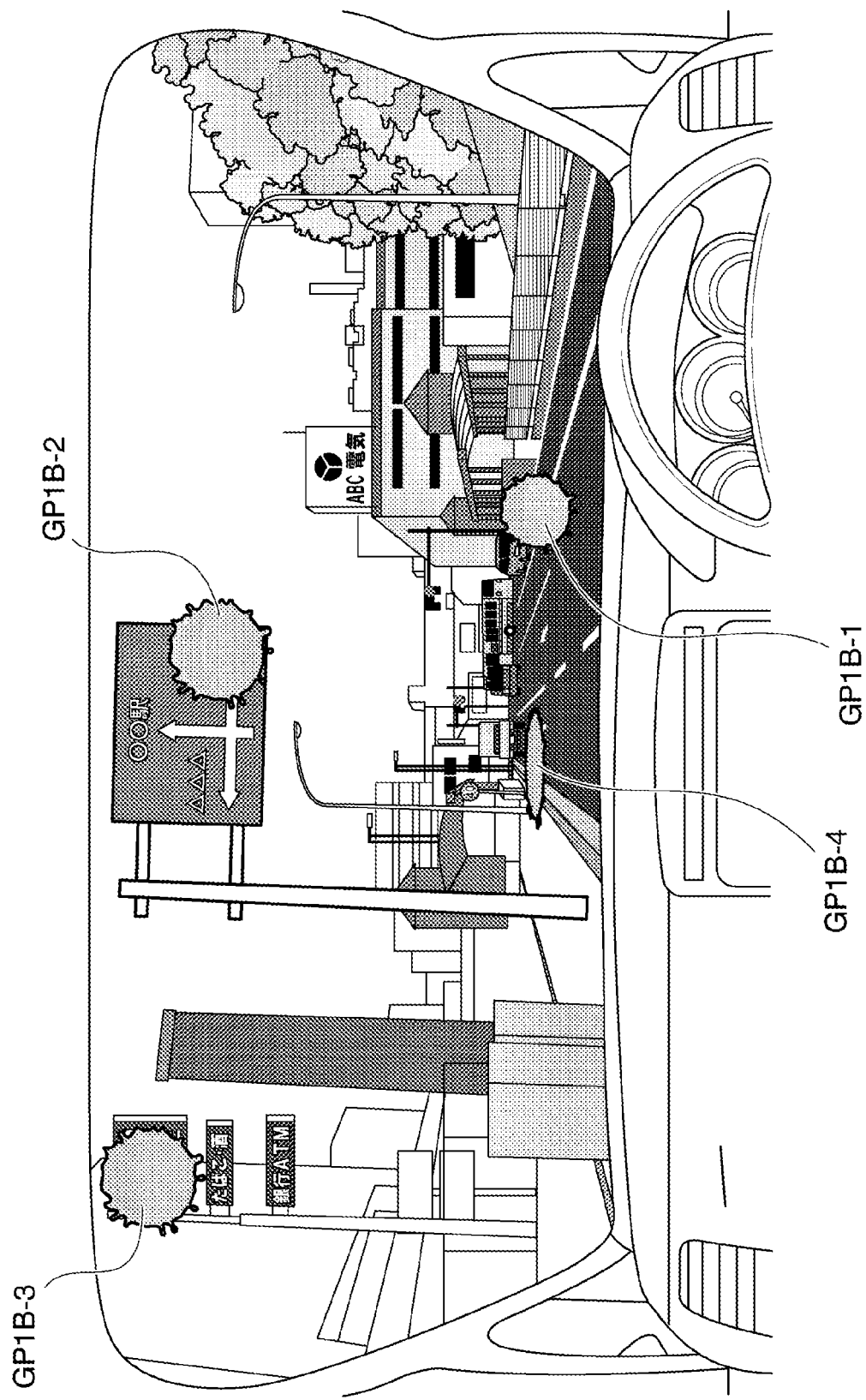
FIG. 4 is a diagram showing an example of a response image showing that shooting has been performed.

FIG. 4 is a diagram showing an example of a response image GP1B indicating that shooting has been performed. The display controller 18 displays a response image GP1B (shown response images GP1B-1 to GP1B-4) indicating that shooting has been performed, on the display 60. As shown in FIG. 4, the response image GP1B is, for example, an image in which ink is applied to a predetermined region. The display controller 18 presents the response image GP1B in the pointing direction indicated by the motion information, and clearly indicates that the shooting motion has been performed, to the occupant PS. Further, the display controller 18 may display the response image GP1B to be superimposed on the shooting target. Specifically, the display controller 18 may display the response image (the shown response image GP1B-1) to be superimposed on an oncoming vehicle. Further, the display controller 18 may display the response image (the shown response image GP1B-2) to be superimposed on a road sign. Further, the display controller 18 may display the response image (the shown response image GP1B-3) to be superimposed on a signboard of a store present around the vehicle V. Further, when there is no shooting target in a direction indicated by the pointing motion, the display controller 18 may display the response image (the shown response image GP1B-4) on a road surface in the direction.

A configuration in which the display controller 18 displays a predetermined region indicated by the response image GP1B in an enlarged or reduced manner as the shooting target approaches or moves away from movement of the vehicle V may be adopted. Specifically, a configuration in which the display controller 18 enlarges or reduces the predetermined region indicated by the response image GP1B so that the predetermined region shows a predetermined area may be adopted.

[Example of Response Image Showing Score]

Figure 5:
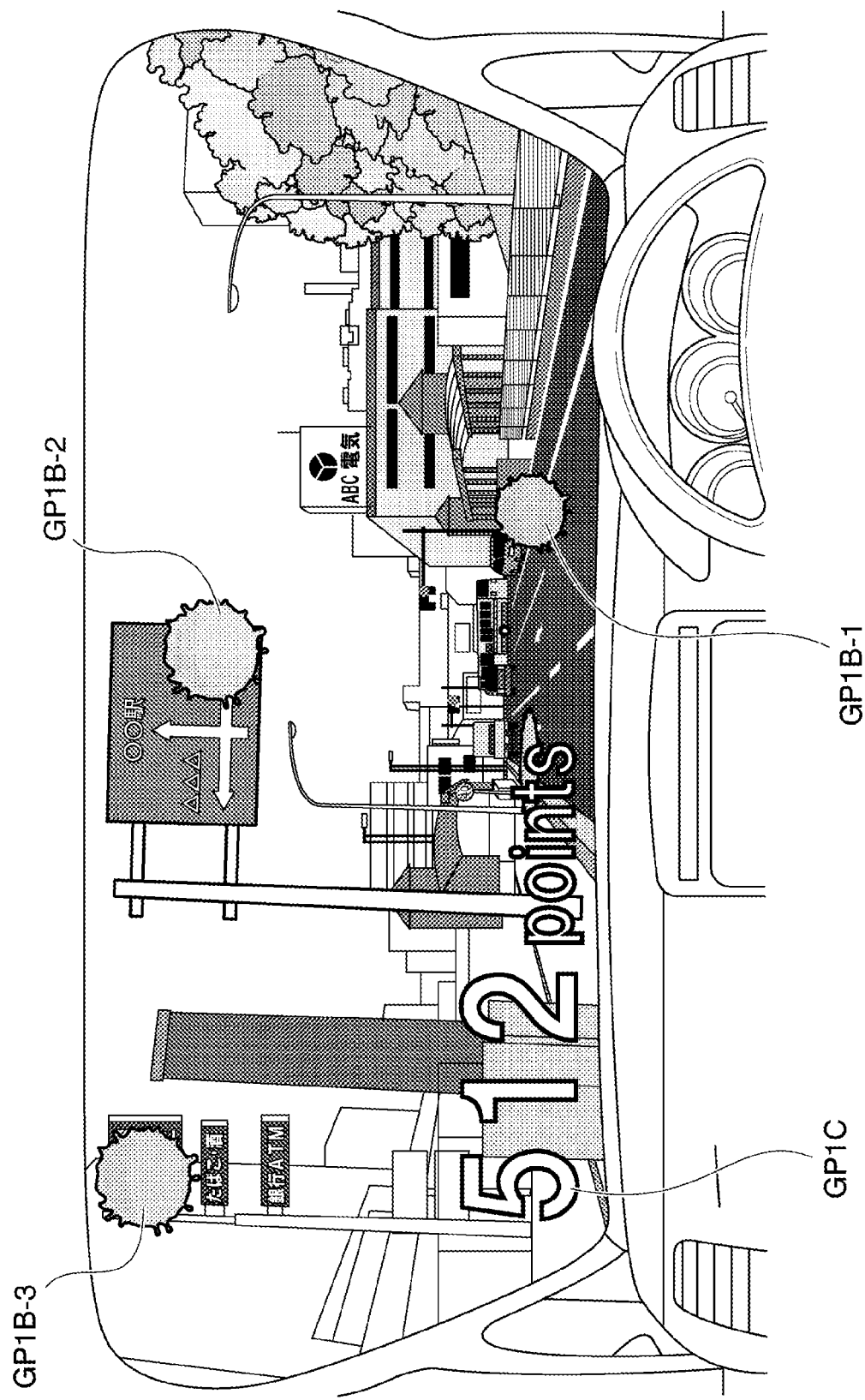
FIG. 5 is a diagram showing an example of a response image showing a score of score information.

FIG. 5 is a diagram showing an example of a response image GP1C indicating the score of the score information. The display controller 18 displays on the display 60 a response image (the shown response image GP1C) indicating the score indicated by the score information, which is a score calculated on the basis of the motion of the occupant PS. As shown in FIG. 5, the response image GP1C is, for example, an image in which the score is indicated by a numerical value. The display controller 18 presents the response image GP1C and clearly indicates an evaluation of the shooting motion of the occupant PS to the occupant PS. The response image GP1C may be an image in which the score is indicated by a level.

Specifically, the response image GP1C may present an image (for example, "beginner", "skilled person", "professional", "expert", and "master") showing the level of the occupant PS according to the score.

[Operation of in-Vehicle Performance Device]

Figure 6:
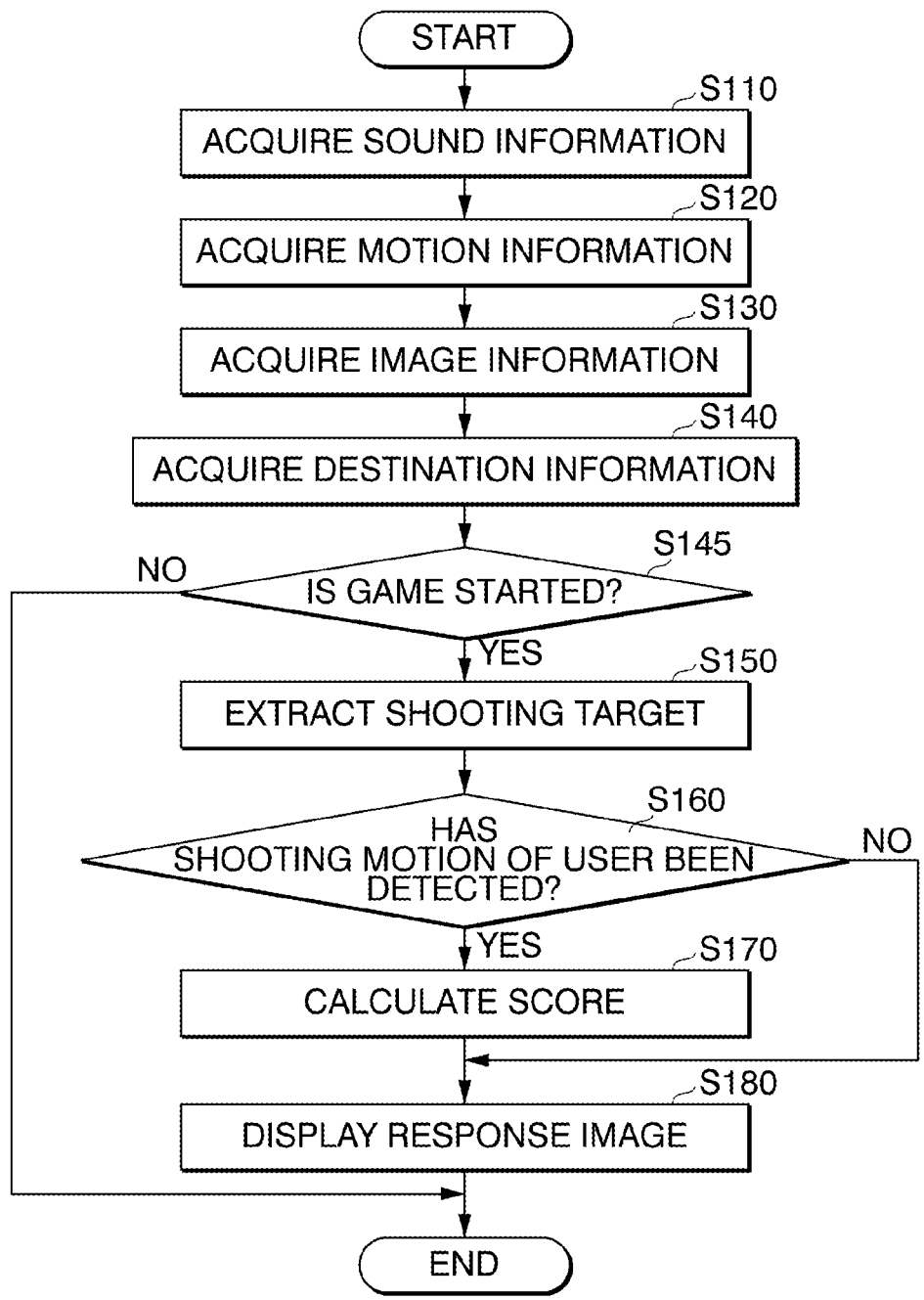
FIG. 6 is a flowchart showing an example of an operation of the in-vehicle performance device according to the first embodiment.

FIG. 6 is a flowchart showing an example of an operation of the in-vehicle performance device 1 according to the first embodiment. The sound information acquirer 11 acquires the sound information from the sound detector 20 continually or at predetermined time intervals (step S110). The motion information acquirer 12 acquires the motion information from the motion detector 30 continually or at predetermined time intervals (step S120). The image information acquirer 13 acquires the image information from the imager 40 continually or at predetermined time intervals (step S130). The destination information acquirer 14 acquires the destination information indicated by the operation input to the inputter 50 (step S140). The occupant PS inputs the destination information through the inputter 50, for example, when starting the travel of the vehicle V.

The game manager 15 manages starting and ending of a game (step S145). The game manager 15 proceeds to a process of step S150 when the operation input to the inputter 50 indicates starting of a shooting game. Further, the game manager 15 ends the process when the operation input to the inputter 50 does not indicate the starting of the shooting game and when the operation indicates the ending of the shooting game that has already been started.

The extractor 16 performs image processing on the surrounding environment image indicated by the image information acquired by the motion information acquirer 12, extracts the shooting target, and generates the virtual position information (step S150). For example, the extractor 16 extracts a shooting target each time the image information acquirer 13 acquires the image information, and generates the virtual position information. The score calculator 17 determines whether or not the occupant PS has performed a shooting motion on the basis of the sound information acquired by the sound information acquirer 11 and the motion information acquired by the motion information acquirer 12 (step S160). When the score calculator 17 determines that the occupant PS has performed the shooting motion, the score calculator 17 calculates a score for the motion of the occupant PS on the basis of the motion information, the image information acquired by the image information acquirer 13, and the virtual position information generated by the extractor 16 (step S170). Further, when the score calculator 17 determines that the occupant PS has not performed the shooting motion, the score calculator 17 does not calculate the score for the motion of the occupant PS, and the process proceeds to step S180. The display controller 18 displays the response image on the display 60 on the basis of the sound information, the motion information, the destination information, and the virtual position information (step S180).

The case in which the shooting motion is a motion for emitting the sound imitating the shooting sound and pointing at the shooting target present in the surrounding environment of the vehicle V with the finger, but the present invention is not limited thereto. The shooting motion may be, for example, any one of a motion for emitting the sound imitating the shooting sound and a motion for pointing at the shooting target present in the surrounding environment of the vehicle V. In this case, the in-vehicle performance device 1 may not include a detector (the sound detector 20 or the motion detector 30) that detects information that is not used for the shooting motion.

Conclusions for First Embodiment

As described above, the in-vehicle performance device 1 of the first embodiment includes the motion detector 30 that detects the motion of the occupant PS of the vehicle V, and the display controller 18 that controls the display of the response image (in this example, the response image GP1A-1) according to the motion of the occupant PS on the basis of the motion of the occupant PS detected by the motion detector 30. Therefore, the in-vehicle performance device 1 of the first embodiment can provide entertainment to the occupant PS moved by the vehicle V.

Further, in the in-vehicle performance device 1 of the first embodiment, the display controller 18 displays the response images (in this example, the response images GP1B-1 to GP1B-3) that are superimposed on the object (the shooting target) in the surrounding environment of the vehicle V. Further, in the in-vehicle performance device 1 of the first embodiment, the shooting motion is a motion for pointing at the object in the surrounding environment, the motion detector 30 detects a pointing direction of the occupant PS (in this example, the motion information), and the display controller 18 displays the response images (in this example, the response images GP1B-1 to GP1B-4) on the basis of the motion information detected by the motion detector 30. Further, the in-vehicle performance device 1 of the first embodiment further includes the score calculator 17 that calculates the score on the basis of the motion information and the virtual position information, and the display controller 18 further displays the response image (in this example, the response image GP1C) indicating the score calculated by the score calculator 17. Accordingly, with the in-vehicle performance device 1 of the first embodiment, it is possible to display the response image on the display 60 through performance with higher entertainment and to improve willingness for the shooting motion of the occupant PS.

[Rule of Shooting Game and Score]

Further, the configuration in which the score calculator 17 calculates the score on the basis of the direction of the pointing motion indicated by the motion information and the position of the shooting target has been described above, but the present invention is not limited thereto. A configuration in which the score calculator 17 calculates a score according to a rule of a shooting game that is performed by the in-vehicle performance device 1 may be adopted. Examples of the rule of the shooting game include a rule in which a road sign in a destination direction indicated by the destination information is a shooting target, a rule in which a specific type of vehicle is a shooting target, and a rule in which a signboard of a store is a shooting target. In the case of this rule, a high score is calculated for a shooting motion for pointing at a shooting target according to the rule among the shooting targets extracted by the extractor 16.

Further, a configuration in which the score calculator 17 calculates the score on the basis of an area in which the response image GP1B (an image in which ink is applied to a predetermined region) is displayed may be adopted. In the following description, a rule for calculating a score on the basis of an area in which the response image GP1B is displayed is referred to as a territory area rule. In the territory area rule, the score calculator 17 calculates a score according to an area of the ink shown in the response image GP1B. Accordingly, with the in-vehicle performance device 1 of the first embodiment, it is possible to display the response image on the display 60 through performance with higher entertainment and to improve willingness for the shooting motion of the occupant PS.

A case in which the extractor 16, the score calculator 17, and the display controller 18 do not execute various processes when the game manager 15 performs the disabling process has been described above, but the present invention is not limited thereto. For example, a configuration in which only the display controller 18 does not execute various processes when the game manager 15 performs the disabling process may be adopted. In this case, various functional units execute processes, but various images are not displayed on the display 60.

Second Embodiment

Hereinafter, a second embodiment of the present invention will be described with reference to the drawings. An in-vehicle performance device 2 that displays an image according to a position of a vehicle V will be described in the second embodiment. Further, the in-vehicle performance device 2 that displays, on a display 60 of the in-vehicle performance device 2, an image that an in-vehicle performance device 2 mounted in another vehicle V displays will be described. Further, the same configurations as those in the first embodiment described above are denoted by the same reference signs and description thereof will be omitted.

Figure 7:
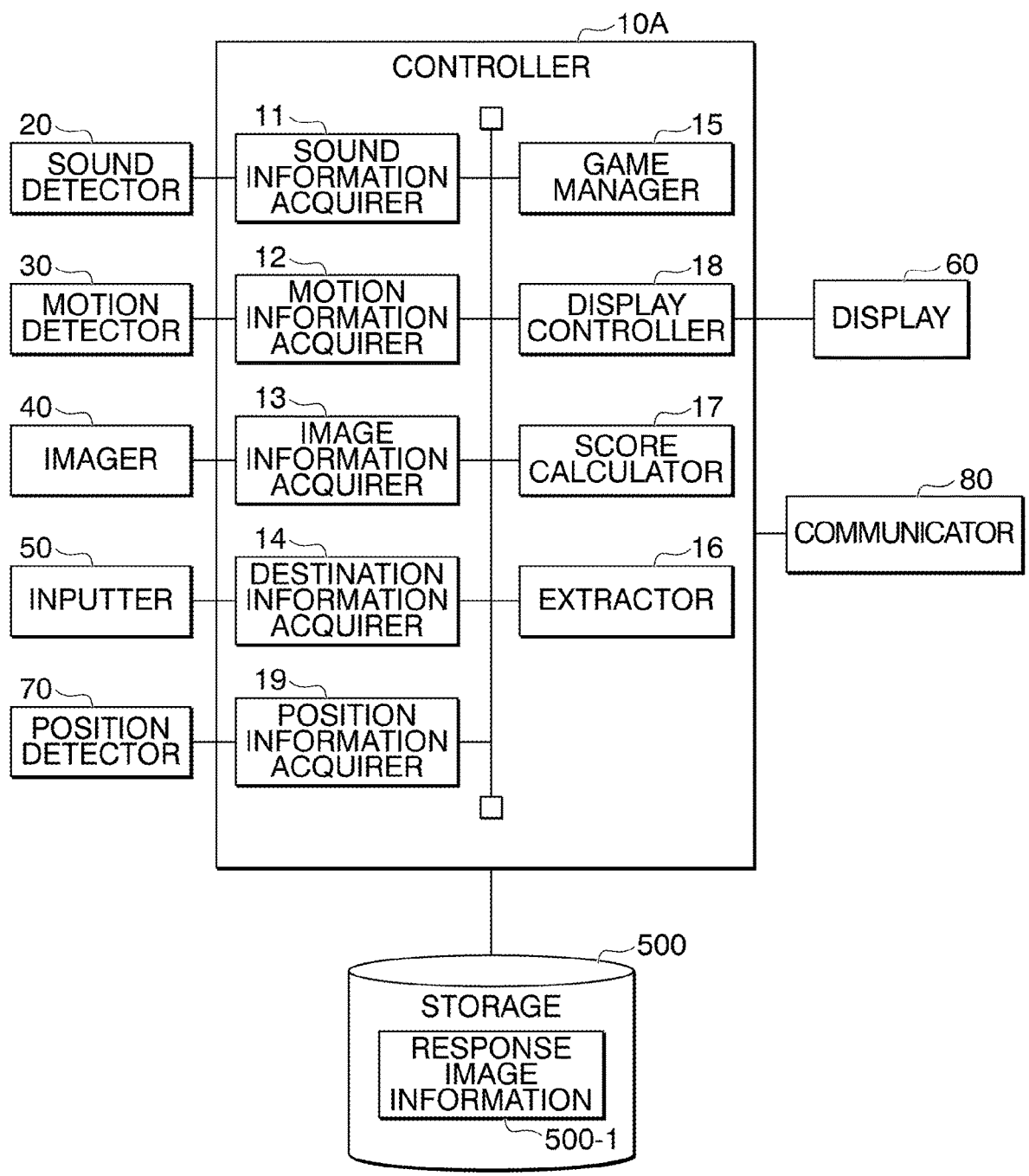
FIG. 7 is a functional configuration diagram showing an example of a configuration of an in-vehicle performance device according to a second embodiment.

FIG. 7 is a functional configuration diagram showing an example of a configuration of the in-vehicle performance device 2 according to the second embodiment. The in-vehicle performance device 2 includes a controller 10A, a sound detector 20, a motion detector 30, an imager 40, an inputter 50, the display 60, a position detector 70, a communicator 80, and a storage 500.

The position detector 70 detects a position at which the vehicle V travels. The position detector 70 detects the position of the vehicle V, for example, using a method using a global navigation satellite system(s) (GNSS) such as a global positioning system (GPS) or a method using a regional navigation satellite system (RNSS) such as a quasi-zenith satellite (QZS). The position detector 70 outputs position information indicating the position of the vehicle V to the controller 10A.

The communicator 80 communicates with a server (not shown) that integrates information to be used for a process of the in-vehicle performance device 2, through wireless communication. The wireless communication is, for example, short-range wireless communication using Wi-Fi (registered trademark) or wireless communication via a mobile communication network such as long term evolution (LTE). Direct communication may be performed between the vehicles V. In this case, the vehicles V perform communication with each other using an ad hoc network such as dedicated short range communications (DSRC).

The controller 10A executes a program stored in the storage 500 to realize a sound information acquirer 11, a motion information acquirer 12, an image information acquirer 13, a destination information acquirer 14, a game manager 15, an extractor 16, a score calculator 17, a display controller 18, and a position information acquirer 19 as the functional units.

The position information acquirer 19 acquires position information from the position detector 70. The position information acquirer 19 acquires the position information continually or at predetermined time intervals. The position information acquirer 19 outputs the acquired position information to the display controller 18 and the communicator 80. Further, the display controller 18 of the second embodiment outputs a response image to be displayed on the display 60 to the communicator 80 continually or at predetermined time intervals.

The communicator 80 associates the position information input from the position information acquirer 19 with the response image input from the display controller 18 and transmits resultant information to the server. In the following description, the information in which the position information is associated with the response image is referred to as position image information. Further, the communicator 80 receives position image information that another in-vehicle performance device 2 has transmitted to the server. Specifically, the communicator 80 receives position image information associated with the position information input from the position information acquirer 19 on the basis of the position information. In other words, the communicator 80 receives position image information associated with position information indicating a current position of the vehicle V from the server. The communicator 80 outputs the received position image information to the display controller 18.

The display controller 18 of the second embodiment receives the position image information from the communicator 80. The display controller 18 displays the response image of the position image information associated with the position information matching the position information input from the position information acquirer 19 on the display 60. That is, the display controller 18 causes the display 60 to display the response images that the other in-vehicle performance device 2 has displayed at a current position of the vehicle V in the past.

[Example of Display of Response Image Displayed by Other in-Vehicle Performance Device]

Figure 8:
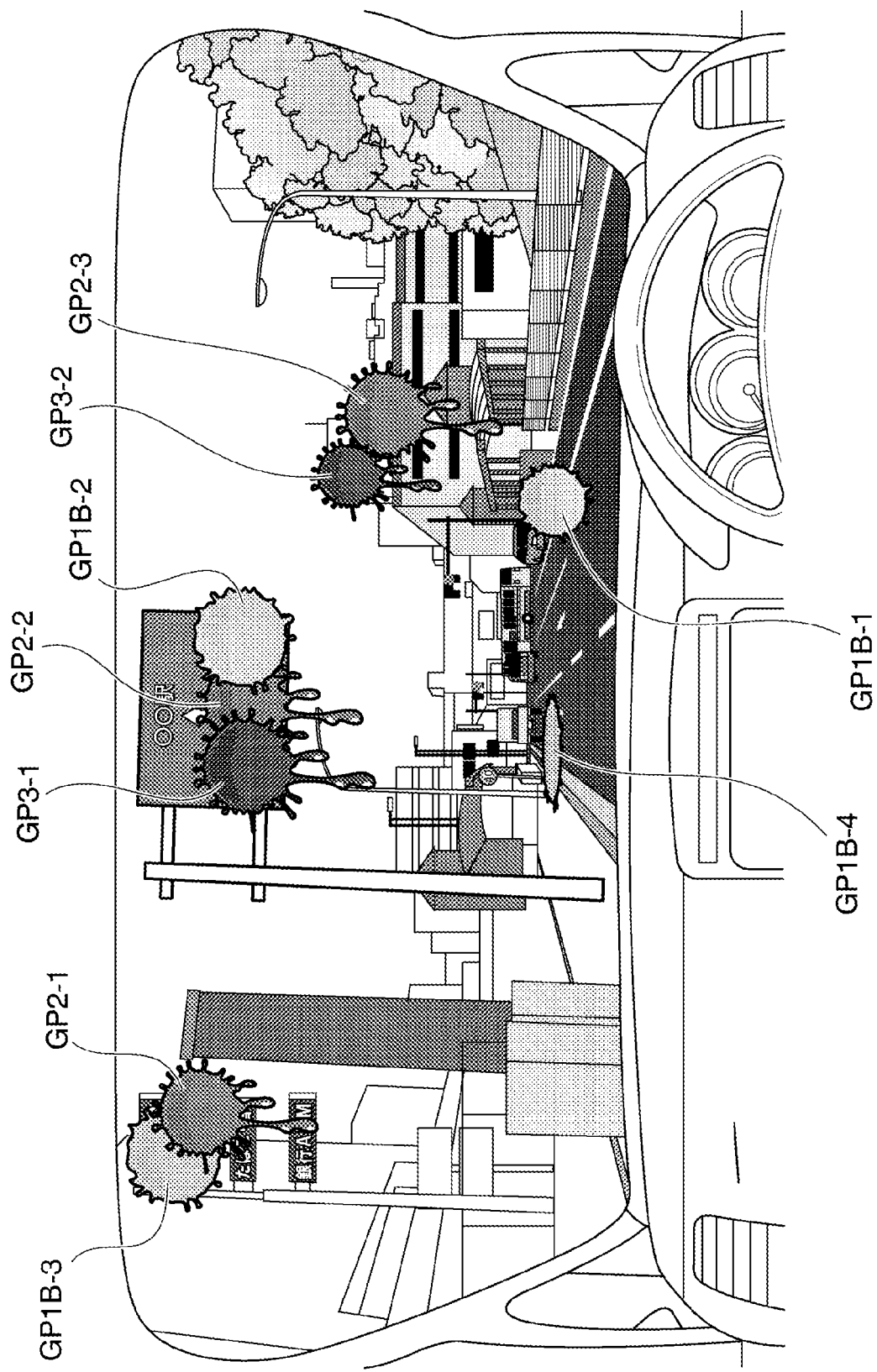
FIG. 8 is a diagram showing an example of a response image displayed by another in-vehicle performance device according to the second embodiment.

FIG. 8 is a diagram showing an example of the response image displayed by the other in-vehicle performance device 2 according to the second embodiment. The display controller 18 displays response images (response images GP1B-1 to GP1B-3 shown in FIG. 8) based on a process of the in-vehicle performance device and response images (response images GP2-1 to GP2-3 and response images GP3-1 to GP3-2 shown in FIG. 8) that the other in-vehicle performance devices 2 has displayed at a current position in the past. The shown response images GP2-1 to GP2-3 are response images that the other in-vehicle performance device 2 has displayed at the current position of the vehicle V in the past. Further, the shown response images GP3-1 to GP3-2 also are response images that still another in-vehicle performance device 2 has displayed at the current position of the vehicle V in the past.

Conclusion of Second Embodiment

As described above, in the in-vehicle performance device 2 of the second embodiment, the position detector 70 detects the position of the vehicle V, the communicator 80 performs transmission and reception of the position image information, and the display controller 18 displays the response images (the response images GP1B-1 to GP1B-3 shown in FIG. 8) based on the process of the in-vehicle performance device and the response images (the response images GP2-1 to GP2-3 and the response images GP3-1 to GP3-2 shown in FIG. 8) that the other in-vehicle performance devices 2 has displayed at the current position of the vehicle V in the past. Accordingly, the in-vehicle performance device 2 of the second embodiment can display a response image in which another person other than the occupant PS has played the shooting game on the display 60, and improve competitiveness of the occupant PS to improve willingness for the shooting motion.

[Confrontation According to Territory Area Rule]

A configuration in which the shooting game performed by the in-vehicle performance device 2 performs confrontation according to the territory area rule between the occupant PS and the other person on the basis of the position image information may be adopted. Specifically, the score calculator 17 calculates a score on the basis of areas of response images (the response images GP2-1 to GP2-3 and the response images GP3-1 to GP3-2 shown in FIG. 8) of the other person shown in the position image information. Further, the score calculator 17 calculates the score on the basis of areas of the response images (the response images GP1B-1 to GP1B-3 shown in FIG. 8) displayed on the basis of the process of the in-vehicle performance device. The in-vehicle performance device 2 determines the occupant PS of the in-vehicle performance device 2 (the vehicle V) that has displayed a high-score response image, as a winner.

[Confrontation According to Territory Area Rule: Team Battle]

Further, a configuration in which the shooting game according to the territory area rule is performed in a team battle may be adopted. For example, a configuration in which the shooting game according to the territory area rule is performed by a plurality of teams (for example, a red team, a blue team, and a yellow team,) may be adopted. In this case, the score calculator 17 calculates a sum of an area of a response image with color matching color of an ink of the response image of the in-vehicle performance device among the response images of the position image information and an area of a response image to be displayed on the basis of the process of the in-vehicle performance device, as a score of the own team. Further, the in-vehicle performance device 2 determines a team having a high score as a winner.

[Territory Area Rule Based on Travel Route]

The case in which the shooting game with the territory area rule is performed on the basis of the area of the response image according to the shooting motion of the occupant PS has been described above, but the present invention is not limited thereto. The in-vehicle performance device 2 may play the shooting game with the territory area rule on the basis of the area of the route in which the vehicle V has traveled, on the basis of the position information acquired by the position information acquirer 19. In this case, the display controller 18 calculates an area by multiplying the route in which the vehicle V having the in-vehicle performance device mounted therein has traveled by a predetermined value indicating a route width, and calculates a score according to the area. Further, the communicator 80 receives travel route information indicating a route in which a vehicle having the other in-vehicle performance device 2 mounted therein has traveled. The score calculator 17 calculates an area by multiplying the route in which the other vehicle has traveled, which is indicated by the received travel route information, by the predetermined value indicating the route width, and calculates a score according to the area. The in-vehicle performance device 2 determines the occupant PS of the vehicle V having a high score as a winner.

[Display of Territory Area Rule Based on Travel Route]

Figure 9:
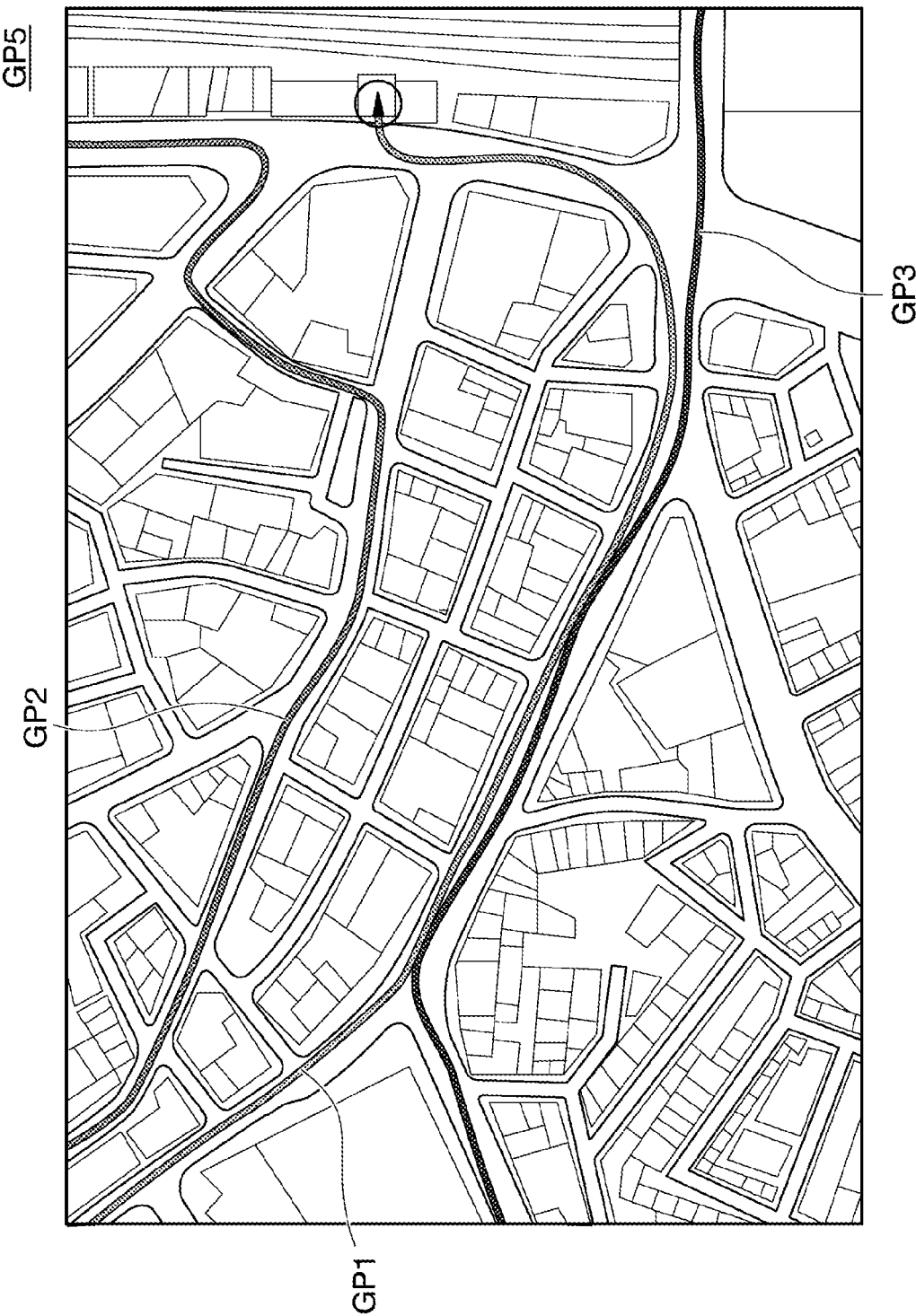
FIG. 9 is a diagram showing an example of a result of a shooting game according to a territory area rule based on a travel route.

Further, a configuration in which the display controller 18 displays an image showing the area of the route in which the vehicle V has traveled and an image showing an area of a route indicated by the received travel route information on the display 60 may be adopted. FIG. 9 is a diagram showing an example of a result of the shooting game according to the territory area rule based on a travel route. In this case, the display controller 18 generates the image (a shown image P1) indicating the route in which the vehicle V has traveled, on the basis of the position information acquirer 19. Further, the communicator 80 receives the travel route information indicating the route in which the vehicle V having the other in-vehicle performance device 2 mounted therein has traveled. The display controller 18 generates the images (shown images P2 and P3) indicating the travel route information received by the communicator 80. The display controller 18 disposes the generated images P1 to P3 to be superimposed on an image (a shown image P5) indicating a map in a predetermined range, and displays the images on the display 60. Accordingly, with the in-vehicle performance device 2 of the second embodiment, it is possible to display a route in which another person other than the occupant PS has moved on the display 60 and to improve competitiveness of the occupant PS to improve willingness for a movement using the vehicle V.

When the occupant PS moves the vehicle V for a long time within a predetermined range for the purpose of victory according to the territory area rule, a traffic jam is likely to occur within the range. In this case, with an automated driving function of the vehicle V, traveling of the vehicle V may be controlled so that the vehicle V is moved to the destination indicated by the destination information or the vehicle V is moved not to stay in the range for a long time.

[Image Showing Victory or Defeat of Shooting Game According to Territory Area Rule]

Figure 10:
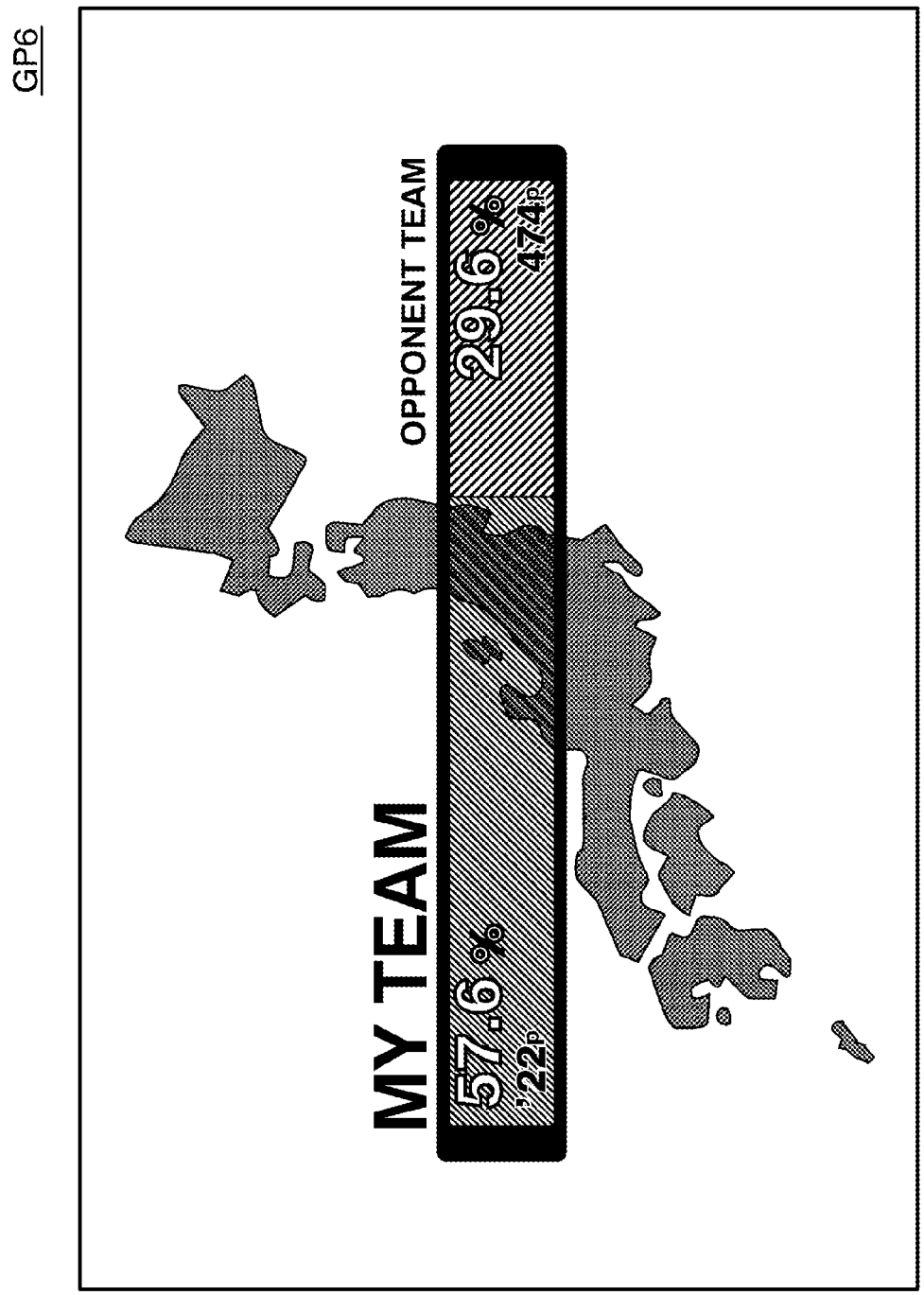
FIG. 10 is a diagram showing an example of victory or defeat in the shooting game according to the territory area rule.

Further, when a shooting game with the territory area rule based on the travel route is performed in a team battle, the display controller 18 may display an image showing the victory or defeat of the game on the display 60. FIG. 10 is a diagram showing an example of victory or defeat in the shooting game according to the territory area rule. The display controller 18 calculates an area of the own team and an area of the other team on the basis of the position information and the travel route information. Further, the display controller 18 generates an image (a shown image P6) showing a ratio between the area of the own team and the area of the other team in a range (a shown entire region of Japan) in which the shooting game with the territory area rule based on the travel route is performed, and displays the image on the display 60. A configuration in which the display controller 18 generates and displays the image P6 in a predetermined range (for example, a range of Kanto Koshinetsu) in the range in which the shooting game with the territory area rule based on the travel route is performed may be adopted. Accordingly, with the in-vehicle performance device 2 of the second embodiment, it is possible to improve competitiveness of the occupant PS to improve willingness for a movement using the vehicle V.

[Relation Between Shooting Game and Reality]

Further, the in-vehicle performance device 2 may be configured to provide services, content, and the like to the occupant PS on the basis of the score calculated by the score calculator 17 or a result of the territory area rule. For example, when the occupant PS has performed the shooting motion on a signboard of a store present around the vehicle V, the in-vehicle performance device 2 transmits information indicating that the shooting motion has been performed, to a server device of the store. The server device of the store gives a coupon available when the occupant PS purchases a product at the store to the occupant PS. Further, when the vehicle V is a vehicle that is used by a car sharing service, the in-vehicle performance device 2 transmits the score calculated by the score calculator 17 to a server device of a service provider that provides the service. The server device of the service provider gives a coupon available in the next car sharing service to the occupant PS that has obtained a high score. Further, a configuration in which various coupons are given to the occupant PS who has won according to the territory area rule or the occupant PS who belongs to a winning team may be adopted.

Further, the in-vehicle performance device 2 may perform a process of prompting movement to a certain shooting target, on the basis of information indicating a behavior of each vehicle V (hereinafter referred to as behavior information). In this case, the behavior information is, for example, the position image information, the position information, and the travel route information acquired by each in-vehicle performance device 2.

The in-vehicle performance device 2 acquires the behavior information acquired from the other in-vehicle performance device 2, from a server in which the behavior information is stored (hereinafter referred to as a "behavior information server"). The in-vehicle performance device 2 may be configured to highlight and display a shooting target on which many others have performed the shooting motion, a shooting target to which a coupon of a store is given, or the like on the basis of the acquired behavior information. Specifically, the in-vehicle performance device 2 may be configured to display a highlighting image to be superimposed on the position of the shooting target on the display 60. Further, the in-vehicle performance device 2 may be configured to display an image obtained by an imager mounted in a vehicle V of the other person having imaged the shooting target in the past, on the display 60. Further, the in-vehicle performance device 2 may be configured to display an image showing a movement direction in which the vehicle V moves to the position of the shooting target, on the display 60.

Here, the occupant PS may move the vehicle V in a direction of the highlighted shooting target, the shooting target on which many others have performed the shooting motion, and the shooting target to which the coupon of the store is given. Therefore, the in-vehicle performance device 2 can prompt the in-vehicle performance device 2 (the vehicle V) to move to a certain shooting target on the basis of the behavior information. The in-vehicle performance device 2, for example, detects a congestion state on the basis of a position at which another in-vehicle performance device 2 (vehicle V) indicated by the behavior information is present. The in-vehicle performance device 2 can move the vehicle V so that congestion is avoided, by prompting a movement to a shooting target at a position different from a congestion position (direction) so that the vehicle V does not move to the congestion position.

Further, a configuration in which the behavior information server performs the process of prompting a movement to a certain shooting target on the basis of the behavior information may be adopted instead of the configuration in which the in-vehicle performance device 2 performs the process of prompting a movement to a certain shooting target on the basis of the behavior information. In this case, the behavior information server transmits, to the in-vehicle performance device 2, an image for prompting a movement of the in-vehicle performance device 2 (the vehicle V) or information for prompting a movement on the basis of the behavior information acquired from each in-vehicle performance device 2. The in-vehicle performance device 2 causes the display 60 to display the image acquired from the behavior information server, for example.

Further, an index indicating a frequency at which the shooting motion has been performed may be attached to the shooting target on the basis of the behavior information acquired from each in-vehicle performance device 2. The in-vehicle performance device 2 or the behavior information server, for example, calculates an index at which the shooting motion has been performed, on the basis of the behavior information acquired from each in-vehicle performance device 2. The in-vehicle performance device 2 may be configured to perform a display for highlighting the response image or the shooting target on the basis of the index.

The in-vehicle performance device 2 determines, for example, that, for a shooting target having a high index attached thereto, a large number of in-vehicle performance devices 2 (vehicles V) are present around the shooting target, that is, crowded. In this case, the in-vehicle performance device 2 may perform a process of not highlighting the shooting target or of not regarding (of filtering) the shooting target as a shooting target. Further, when the shooting target having a high index attached thereto is the shooting target to which the coupon of the store is given, the in-vehicle performance device 2 (or the behavior information server) may perform a process of providing a function of giving the coupon to, for example, a store that is a shooting target (a signboard) having a low index attached thereto among affiliated stores of the store that is the shooting target. Further, the in-vehicle performance device 2 determines that, for a shooting target having a low index attached thereto, a large number of in-vehicle performance devices 2 (vehicles V) are not present around the shooting target, that is, not crowded. In this case, the in-vehicle performance device 2 may perform a process of highlighting the shooting target.

Through these processes, the in-vehicle performance device 2 can prompt the in-vehicle performance device 2 (the vehicle V) to move to a certain shooting target on the basis of the behavior information (the index).

[Non-Image Output Method]

Further, the case in which the display controller 18 outputs a result of the shooting game by displaying various images has been described above, but the present invention is not limited thereto and the display controller 18 may output the result of the shooting game using a sound. Specifically, a configuration in which the vehicle V includes a speaker, and the display controller 18 outputs a shooting sound from the speaker while displaying a response image may be adopted. Further, a configuration in which the display controller 18 outputs sound for informing of the result or victory or defeat of the shooting game from the speaker while displaying the result or victory or defeat of the shooting game shown in the image P5 or the image P6 on the display 60 may be adopted.

[Image Display Method Other than Display]

Further, the case in which various images are displayed on the display 60 has been described above, but the present invention is not limited thereto. For example, in the case of an open car or a vehicle having no front window, a configuration in which the occupant PS in the vehicle uses a head mounted device may be adopted. In this case, the head mounted device displays the surrounding environment image of the vehicle imaged by the imager 40 and the response image that are superimposed on each other. Further, a configuration in which the vehicle V includes the display 60 provided on a side window, in addition to the front window may be adopted. In this case, the extractor 16 performs an image recognition process on the surrounding environment image, and recognizes positions on the surrounding environment image of various objects captured in the surrounding environment image. Further, the extractor 16 matches a position on the side window when the surrounding environment image is presented in an actual size onto the side window with a position on the surrounding environment image of the extracted object (the shooting target). The extractor 16 outputs the position of the front window to the score calculator 17 and the display controller 18 as virtual position information indicating a virtual position of the shooting target. When a size of the side window is smaller than that of the front window, it is preferable for a target of the shooting motion performed from the side window to be a shooting target with a large volume or area, that is, a shooting target on which it is easy for the shooting motion to be performed in a small region (the side window).

[Image Display Method Based on Vehicle Information]

Further, the in-vehicle performance device 1 and the in-vehicle performance device 2 (hereinafter simply referred to as an "in-vehicle performance device") may have a configuration for detecting a state of the vehicle V. In this case, the in-vehicle performance device includes a vehicle state acquirer. The vehicle state acquirer acquires motion parameters such as a speed, a rudder angle, and a pitch and roll angle of the vehicle V. The display controller 18, for example, displays various images on the basis of the motion parameters acquired by the vehicle state acquirer. Specifically, the display controller 18 performs a refreshing process on an image to be displayed on the display 60 on the basis of the speed of the vehicle V. More specifically, the display controller 18 performs a refreshing operation on an image to be displayed on the display 60 at a time interval sufficiently faster than a change in the surrounding environment with a movement of the vehicle V on the basis of the speed of the vehicle V.

Further, the display controller 18 displays an image according to the traveling direction of the vehicle V on the display 60 on the basis of, for example, the rudder angle and the pitch and roll angle of the vehicle V among the acquired motion parameters. Here, the vehicle V may turn (turn right or left) in a direction other than a straight direction on the basis of control. In this case, the occupant PS may turn his eyes to the traveling direction, that is, a turning direction, instead of the front of the vehicle V. The display controller 18 can display an image according to a line of sight of the occupant PS by displaying the image according to the traveling direction of the vehicle V on the display 60 on the basis of the motion parameters.

Further, a configuration in which the display controller 18 displays various images on the display 60 on the basis of a vibration on the vehicle V may be adopted. The display controller 18, for example, displays various images at a distance and in a direction opposite to a distance and a direction at and in which the vehicle V moves with the vibration according to the vibration applied to the vehicle V. Accordingly, the in-vehicle performance device 2 can suppress shake of the image displayed on the display 60 with the vibration. Therefore, the in-vehicle performance device 2 can suppress the occupant sickness from being caused by the occupant PS visually recognizing the image on the display 60. A configuration in which the display controller 18 displays various images on the display 60 on the basis of a relative movement distance and direction between a vibration applied to the vehicle V and a vibration applied to the occupant PS may be adopted.

Third Embodiment

Hereinafter, a third embodiment of the present invention will be described with reference to the drawings. In the third embodiment, an in-vehicle performance device 3 that specifies a pointing target on the basis of a three-dimensional point group in a real space in a pointing direction through a pointing motion of an occupant PS and generates a history of the pointing motion of the occupant PS will be described. The same configurations as those in the embodiments described above are dented by the same reference signs and description thereof will be omitted. Here, the in-vehicle performance device 3 is an example of a "pointing measurement device".

Figure 11:
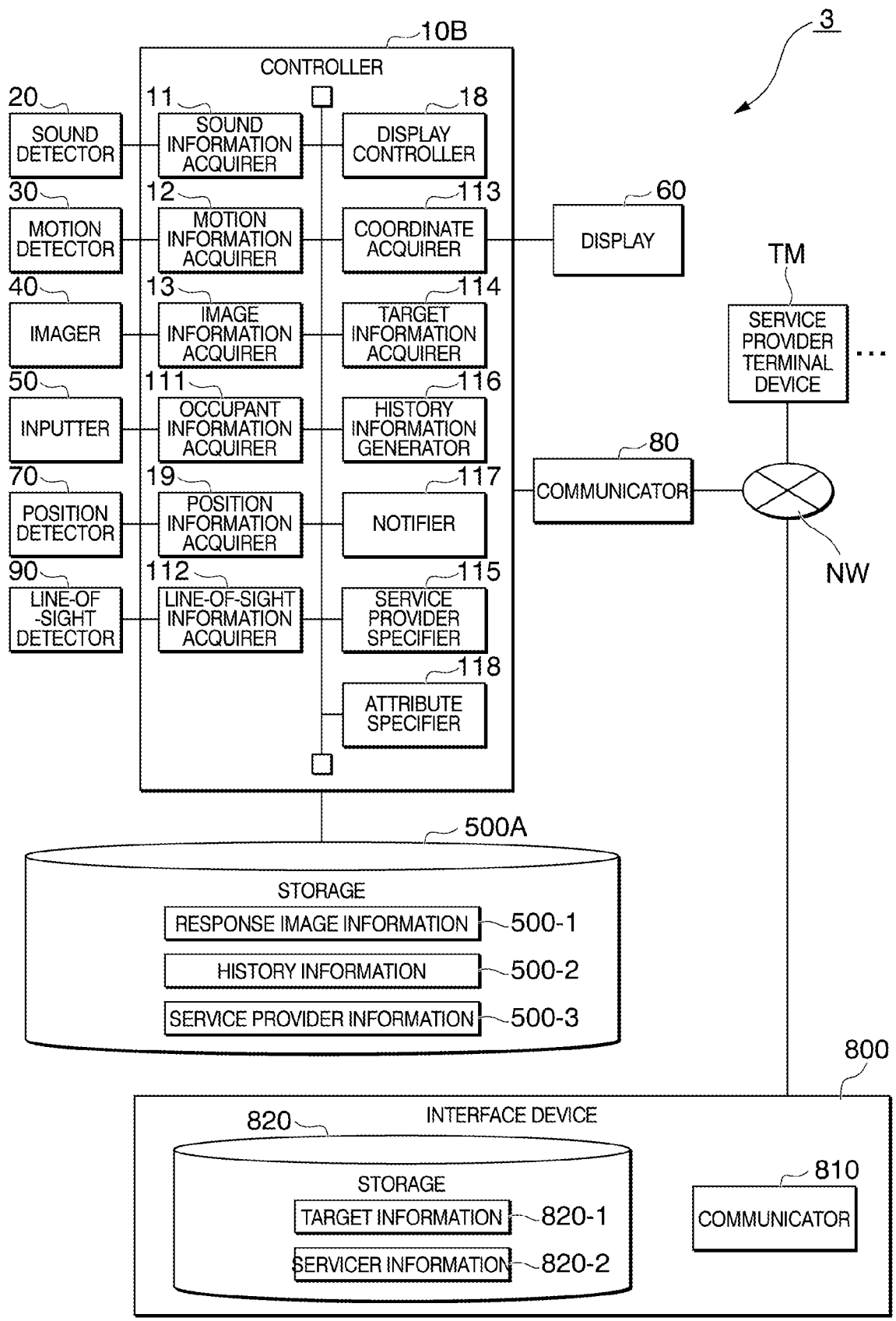
FIG. 11 is a functional configuration diagram showing an example of a configuration of an in-vehicle performance device according to a third embodiment.

FIG. 11 is a functional configuration diagram showing an example of a configuration of the in-vehicle performance device 3 according to the third embodiment. The in-vehicle performance device 3 (a communicator 80) of the third embodiment transmits and receives information to and from a service provider terminal (hereinafter referred to as a service provider terminal device TM) and an interface device 800 via a network NW.

The interface device 800 includes a controller 810 and a storage 820. The storage 820 stores target information 820-1 and servicer information 820-2. The target information 820-1 is information in which information indicating a target present in a real space indicated by the three-dimensional point group is associated with information indicating the three-dimensional point group. The servicer information 820-2 is information in which information indicating the target is associated with information indicating a service provider relevant to the target.

The controller 810 searches for the target information 820-1 or the servicer information 820-2 on the basis of the information received from the in-vehicle performance device 3 and transmits the information indicating the target or the information indicating the service provider to the in-vehicle performance device 3.

The in-vehicle performance device 3 includes a sound detector 20, a motion detector 30, an imager 40, an inputter 50, a display 60, a position detector 70, a communicator 80, and a line-of-sight detector 90. Further, the in-vehicle performance device 3 includes a controller 10B instead of (or in addition to) the controller 10 or the controller 10A, and includes a storage 500A instead of (or in addition to) the storage 500. The storage 500A stores response image information 500-1, history information 500-2, and service provider information 500-3. Details of each piece of information will be described below.

The controller 10B executes a program stored in the storage 500A to execute a sound information acquirer 11, a motion information acquirer 12, an image information acquirer 13, a display controller 18, a position information acquirer 19, an occupant information acquirer 111, a line-of-sight information acquirer 112, a coordinate acquirer 113, a target information acquirer 114, a service provider specifier 115, a history information generator 116, a notifier 117, and an attribute specifier 118 as functional units thereof.

The occupant PS inputs information (hereinafter referred to as an occupant ID) for identifying the occupant to the inputter 50, and the occupant information acquirer 111 acquires the occupant ID input to the inputter 50. For example, when the occupant PS has gotten in the vehicle V, the occupant PS inputs the occupant ID to the inputter 50.

The line-of-sight detector 90 detects, for example, a position (hereinafter referred to as a viewpoint position) in a real space visually recognized by the occupant PS imaged by an imager (not shown) that images the inside of the vehicle V. The line-of-sight information acquirer 112 acquires information indicating the viewpoint position of the occupant PS detected by the line-of-sight detector 90.

The coordinate acquirer 113 acquires a three-dimensional point group in the real space in a pointing direction according to the pointing motion of the occupant PS on the basis of a pointing motion of the occupant PS acquired by the motion information acquirer 12 and the viewpoint position of the occupant PS acquired by the line-of-sight information acquirer 112 on the basis of a surrounding environment image of the vehicle V imaged by the imager 40. The coordinate acquirer 113 detects, for example, feature points of the object shown in the surrounding environment image of the vehicle V imaged by the imager 40, which is an object present in the real space in the pointing direction, and acquires a set of detected feature points as the three-dimensional point group in the real space in the pointing direction. In this case, the imager 40 is a stereo camera.

The target information acquirer 114 acquires the information indicating the target present in the real space on the basis of the information indicating the three-dimensional point group in the real space in the pointing direction specified by the coordinate acquirer 113. The target information acquirer 114 transmits, for example, the information indicating the three-dimensional point group in the real space in the pointing direction specified by the coordinate acquirer 113 to the interface device 800 via the network NW. When the controller 810 of the interface device 800 receives the information indicating the three-dimensional point group from the in-vehicle performance device 3, the controller 810 searches for the target information 820-1 using the information as a search key, and specifies the target with which the three-dimensional point group indicated by the information has been associated. The controller 810 transmits information indicating the specified target to the in-vehicle performance device 3 via the network NW. The target information acquirer 114 acquires the information indicating the target received from the interface device 800.

The service provider specifier 115 specifies the service provider associated with the target acquired by the target information acquirer 114. The service provider specifier 115, for example, transmits the information indicating the target acquired by the target information acquirer 114 to the interface device 800 via the network NW. When the controller 810 of the interface device 800 acquires the information indicating the target from the in-vehicle performance device 3, the controller 810 searches for the servicer information 820-2 using the information as a search key and specifies the service provider associated with the target indicated by the information. The controller 810 transmits information indicating the specified target to the in-vehicle performance device 3 via the network NW. The service provider specifier 115 acquires the information indicating the service provider received from the interface device 800.

The history information generator 116 generates the history information 500-2 indicating a history of the pointing target pointed by the occupant PS through the pointing motion.

FIG. 12 is a diagram showing an example of content of the history information 500-2. As shown in FIG. 12, the history information 500-2 is information in which an occupant ID, a date and time when the occupant PS has performed a pointing motion (hereinafter referred to as a pointing date and time), the pointing target pointed through the pointing motion of the occupant PS, and a service provider corresponding to the pointing target are associated with each other for each occupant ID. The history information generator 116, for example, associates the pointing date and time when the pointing motion of the occupant PS has been acquired by the motion information acquirer 12, the target indicated by the information acquired by the target information acquirer 114, which is the target pointed through the pointing motion, the service provider indicated by the information acquired by the service provider specifier 115, which is a service provider corresponding to the pointed target, and the occupant ID of the occupant PS to generate the history information 500-2, and stores the history information 500-2 in the storage 500A. A relationship between the target and the service provider can be arbitrarily set. For example, it is not essential that the target is a property of the service provider. Further, a non-business target (for example, a sign or a signal in the first embodiment) may be defined as a target relevant to the service provider.

The notifier 117 notifies the service provider associated with the target pointed by the occupant PS that the pointing target has been pointed by the occupant PS.

FIG. 13 is a diagram showing an example of content of the service provider information 500-3. As shown in FIG. 13, the service provider information 500-3 is information in which information indicating a service provider (a shown service provider name) and a notification destination are associated with each other. The notifier 117 searches for the service provider information 500-3 using the service provider specified by the service provider specifier 115 as a search key, and notifies the notification destination associated with the service provider that the occupant PS has performed a pointing motion, that is, the occupant PS is interested in a target with which the service provider has been associated. An address of the service provider terminal device TM (for example, a server device), for example, is indicated in the notification destination.

For example, the notifier 117 may send a notification to the service provider each time the occupant PS performs the pointing motion. The notifier 117 may perform extraction from the history information 500-2 in a predetermined period for each associated service provider and send a notification to the service provider. Further, the notifier 117 may notify the occupant PS of the history information 500-2, in addition to notifying the service provider of the history information 500-2. Accordingly, the occupant PS can use the history information 500-2 as information indicating his or her interest. Further, the occupant PS can acquire information on the service provider on which the occupant PS has performed a pointing motion by referring to the notified history information 500-2.

Conclusion of Third Embodiment

As described above, the in-vehicle performance device 3 of the third embodiment includes the motion detector 30 configured to detect the motion of the occupant PS in the vehicle V, the line-of-sight detector 90 configured to detect the viewpoint position of the occupant PS, the line-of-sight information acquirer 112 configured to acquire the three-dimensional point group in the real space in the pointing direction according to the pointing motion of the occupant PS on the basis of the pointing motion of the occupant PS detected by the motion detector 30 and the viewpoint position of the occupant PS detected by the line-of-sight detector 90, the target information acquirer 114 configured to acquire information indicating the target associated with the three-dimensional point group acquired by the coordinate acquirer 113 from the interface device 800 supplying the information indicating the target present in the real space indicated by the three-dimensional point group, the service provider specifier 115 configured to specify the service provider associated with the target indicated by the information acquired by the target information acquirer, on the basis of the servicer information 820-2 indicating the service provider associated with the target, and the history information generator 116 configured to generate the history information 500-2 in which the service provider specified by the service provider specifier 115 is associated with the target indicated by the information acquired by the target information acquirer 114, and the history of the pointing motion performed by the occupant PS is acquired such that information on the interest of the occupant PS can be collected. Further, according to the in-vehicle performance device 3 of the third embodiment, it is possible to notify the service provider associated with the target on which the pointing motion has been performed that the pointing motion has been performed.

[Three-Dimensional Point Group Transmitted to Interface Device 800]

The case in which the information indicating the three-dimensional point group acquired by the coordinate acquirer 113 is all transmitted to the interface device 800 has been described above, but the present invention is not limited thereto. For example, a configuration in which the coordinate acquirer 113 selects a three-dimensional point group to be transmitted to the interface device 800 from among acquired three-dimensional point groups on the basis of an attribute of the surrounding environment of the vehicle V, and transmits the selected three-dimensional point group may be adopted.

In this case, the attribute specifier 118 specifies the attribute of the surrounding environment of the vehicle V on the basis of the surrounding environment image of the vehicle V imaged by the imager 40. This attribute is, for example, a property (a feature) of the surrounding environment of the vehicle V, such as a highway or a store crowded region. The attribute specifier 118 analyzes, for example, whether a traffic road sign of a highway is captured in the surrounding environment image of the vehicle V imaged by the imager 40 or a large number of signs of stores are imaged, and specifies the attribute of the surrounding environment of the vehicle V. Here, an example of the "attribute" has included the property (the feature) of the surrounding environment is described, but the present invention is not limited thereto. A plurality of "attributes" may be specified in such a manner that some or all of attributes of identifiable targets have been listed at coordinates, in directions, or the like.

A configuration in which the attribute specifier 118 transmits the surrounding environment image of the vehicle V imaged by the imager 40 to the interface device 800 via the network NW, and the interface device 800 specifies the attribute of the surrounding environment of the vehicle V may be adopted. In this case, the attribute specifier 118 transmits the surrounding environment image of the vehicle V imaged by the imager 40 via the network NW, and acquires information indicating the attribute of the surrounding environment of the vehicle V from the interface device 800 to specify the attribute.

Further, a configuration in which the attribute specifier 118 specifies the attribute of the surrounding environment of the vehicle V, for example, on the basis of position attribute information in which the position information is associated with the attribute may be adopted. In this case, the position attribute information may be stored in the storage 500A or may be stored in the storage 820. When the position attribute information is stored in the storage 820, the attribute specifier 118 transmits information indicating the current position of the vehicle V via the network NW, and acquires information indicating the surrounding environment of the vehicle V from the interface device 800 to specify the attribute.

The coordinate acquirer 113 transmits the information indicating the three-dimensional point group to the interface device 800 on the basis of the attribute specified by the attribute specifier 118. Here, when the vehicle V moves at high speed on a "highway", an amount of data of the three-dimensional point group acquired during the pointing motion is likely to increase. Therefore, for example, when the specified attribute is a "highway", the coordinate acquirer 113 can narrow a range pointed through the pointing motion, which is a range in which the three-dimensional point group is acquired, in comparison with a usual case, and curb the amount of data that is transmitted to the interface device 800.

Further, when the vehicle V moves in a "store crowded region", there may be a plurality of targets (that is, signboards) that are pointed through a pointing motion. Therefore, for example, when the specified attribute is the "store crowded region", the coordinate acquirer 113 can widen a range pointed through the pointing motion, which is a range in which the three-dimensional point group is acquired, in comparison with a usual case, and acquire a large amount of information indicating the target from the interface device 800. Accordingly, the in-vehicle performance device 3 can generate the faithful history information 500-2. That is, it is possible to perform various displays and performances for occupants, as described in the first embodiment, on the basis of the pointing motion including a motion of an occupant irrelevant to driving, which has been measured by the pointing measurement device as the aspect of the invention, and to achieve reuse of information and utilization of the information for other purposes by appropriately recording and holding the pointing motion and a history thereof.

The embodiments of the present invention have been described in detail with reference to the drawings, but a specific configuration is not limited to the embodiments, and appropriate changes may be made without departing from the spirit of the present invention. The configurations described in the respective embodiments described above may be combined.

What is claimed is:

1. An in-vehicle performance device performing a game played by an occupant in a vehicle, the in-vehicle performance device comprising:
 a motion detector configured to detect a pointing motion of a finger of the occupant at an object in a surrounding environment of the vehicle, the pointing motion being irrelevant to driving the vehicle;
 an imager configured to image the surrounding environment and acquire image information indicating a generated surrounding environment image;
 an extractor configured to extract a specific object and attribute on the basis of the image information acquired by the imager;
 a display configured to display an image visually recognizable by the occupant; and
 a display controller configured to display a response image according to the pointing motion on the display on the basis of a comparison with a direction of the pointing motion and position information of the object, an attribute of the specific object extracted by the extractor, and the pointing motion detected by the motion detector, and output a result of the game based on a predetermined rule.

2. The in-vehicle performance device according to claim 1, wherein the display controller causes the response image to be superimposed on an object in the surrounding environment of the vehicle and displayed on the display.

3. The in-vehicle performance device according to claim 2,
wherein the display controller causes the response image to be displayed on the display so that the response image is superimposed on the specific object in a pointing direction of the finger, on the basis of the direction detected by the motion detector.

4. The in-vehicle performance device according to claim 2, further comprising:
a score calculator configured to calculate, as a score, a number of times the motion detector detects pointing motions of the finger, comprising the pointing motion, at specific objects comprising the specific object,
wherein the display controller causes an image showing the score calculated by the score calculator to be displayed on the display at a predetermined timing.

5. The in-vehicle performance device according to claim 4, comprising:
a destination information acquirer configured to acquire destination information indicating a destination;
wherein the extractor configured to extract a specific road sign to the destination indicated by the destination information from the generated surrounding environment image, and
the score calculator further calculates, in the score, the number of times the motion detector has detected the pointing motion pointing at a position corresponding to the specific road sign extracted by the extractor.

6. The in-vehicle performance device according to claim 4,
wherein the extractor extracts another vehicle traveling near the vehicle as the specific object from the generated surrounding environment image, and
the score calculator further calculates, in the score, the number of times the motion detector has detected the pointing motion pointing at a position corresponding to the another vehicle extracted by the extractor.

7. The in-vehicle performance device according to claim 5,
wherein the extractor extracts a signboard present around the vehicle as the specific object from the generated surrounding environment image, and
the score calculator further calculates, in the score, the number of times the motion detector has detected the pointing motion pointing at a position corresponding to the signboard extracted by the extractor.

8. The in-vehicle performance device according to claim 4, wherein the display controller causes an image showing a sum of scores calculated by the score calculator to be displayed on the display.

9. The in-vehicle performance device according to claim 1, further comprising:
a sound detector configured to detect a sound of the occupant corresponding to the pointing motion, wherein the response image is further displayed, by the display controller, based on the sound.

* * * * *